(12) United States Patent
Bakke et al.

(10) Patent No.: US 7,323,150 B2
(45) Date of Patent: Jan. 29, 2008

(54) METHODS FOR RECOVERING AT LEAST ONE METALLIC ELEMENT FROM ORE

(75) Inventors: Bart F. Bakke, The Woodlands, TX (US); David Madden, Alexandria, KY (US)

(73) Assignee: Cabot Corporation, Boston, MA (US)

( * ) Notice: Subject to any disclaimer, the term of this patent is extended or adjusted under 35 U.S.C. 154(b) by 426 days.

(21) Appl. No.: 10/444,930

(22) Filed: May 23, 2003

(65) Prior Publication Data

US 2004/0253157 A1   Dec. 16, 2004

(51) Int. Cl.
*C01G 45/12* (2006.01)
*C22B 26/10* (2006.01)
*C01D 17/00* (2006.01)

(52) U.S. Cl. .............. 423/179; 423/184; 423/193; 423/198; 423/421; 423/199; 423/179.5; 423/201; 423/202; 423/203

(58) Field of Classification Search .......... 423/179, 423/184, 193, 198, 421, 199, 179.5, 201, 423/202, 203
See application file for complete search history.

(56) References Cited

U.S. PATENT DOCUMENTS

| 2,021,987 A | * | 11/1935 | Colton | 423/179.5 |
|---|---|---|---|---|
| 2,793,933 A | * | 5/1957 | Kroll | 423/179.5 |
| 2,808,313 A | | 10/1957 | Fleischmann | 23/32 |
| 3,207,571 A | | 9/1965 | Berthold | 23/33 |
| 4,466,950 A | | 8/1984 | Mein | 423/599 |
| 4,469,670 A | | 9/1984 | Mein | 423/599 |
| 4,597,955 A | | 7/1986 | Mein | 423/184 |
| 4,938,934 A | | 7/1990 | Pillai et al. | 423/197 |
| 2001/0005497 A1 | * | 6/2001 | Kawai et al. | 423/179 |

FOREIGN PATENT DOCUMENTS

| JP | 5-222563 | 8/1993 |
|---|---|---|
| SU | 1546425 | 2/1990 |

OTHER PUBLICATIONS

International Search Report for PCT/US2004/015990.
Written Opinion for PCT/US2004/015990.
Matthew McMenamin "Structural Materials CER-022-51" Mar. 2, 2002, pp. 1-10.
Kirk-Othmer Encyclopedia of Chemical Technology Fourth Ed., vol. 5, pp. 749-764.
Kirk-Othmer Encyclopedia of Chemical Technology Fourth Ed., vol. 5, pp. 749-764, 1991.

* cited by examiner

*Primary Examiner*—Steven Bos

(57) ABSTRACT

A method for recovering at least one metallic element from ore or other material is described and includes reacting ore or other material with a salt capable of recovering the metallic element from the ore or other material to form a reaction product that includes the metallic element. The method also includes recovering the metallic element from the reaction product. To remove the metallic element from the reaction product, the method can involve crushing the reaction product to form a crushed material and dissolving the crushed material in a solvent to remove the precipitates, thereby leaving a sulfate solution containing the metallic element.

66 Claims, 9 Drawing Sheets

METHODS FOR RECOVERING AT LEAST ONE METALLIC ELEMENT FROM ORE

BACKGROUND OF THE INVENTION

The present invention relates to ore or similar materials, and more particularly relates to methods for recovering at least one metallic element from ore or other material.

Processes for the recovery of cesium (Cs) from pollucite and other cesium-containing minerals were reviewed by J. J. Kennedy in Chemical Reviews, Vol. 23 (1938), pages 157-163. More recent technical developments were summarized by R. A. Heindl, Bureau of Mines Bulletin 650, "Mineral Facts and Problems" (1970 ed.), pages 527-534. In one process that has undergone considerable development for commercial use, ground pollucite ore is leached with strong sulfuric acid to obtain an extract containing cesium alum, which is recovered by crystallization for further processing. The cesium alum process has been considered a traditional process for recovering cesium from pollucite. However, other recovery processes have been proposed, as described in the above citations. The first step in most such processes is an acid leaching of the pollucite to obtain cesium as a soluble salt in a mixture with other metal salts. Such an acid extraction occurs readily with a variety of strong acids, including not only sulfuric acid, but also hydrobromic and hydrochloric acids.

As already mentioned, when sulfuric acid is used for the digestion step, the cesium can be recovered as cesium alum, expressed as $CsAl(SO_4)_2 12H_2O$ or $Cs_2 SO_4Al_2 (SO_4)_3 24H_2O$. Processes for further purification of cesium starting with a cesium alum are described in U.S. Pat. Nos. 4,469,670 and 4,466,950. When hydrobromic acid is used, the aluminum bromide can be removed first by isopropyl alcohol extraction, and thereafter the mixed alkali metal bromides are recovered and treated in an extractor to obtain a solution of cesium tribromide which, upon evaporation, yields cesium bromide.

Where hydrochloric acid is the extractant, the cesium can be precipitated by the addition of antimony chloride to form a precipitated antimony chloride ($CsSbCl_6$), which can be separated and decomposed in water to form cesium chloride and a water-soluble compound of antimony. The cesium chloride can then be reacted with perchloric acid to produce crystals of cesium perchlorate, which can be recovered and then decomposed to obtain cesium chloride as the final product. (See U.S. Pat. No. 2,808,313.)

While the above described processes are capable of producing cesium sulfate, cesium bromide, and cesium chloride, the above processes are not capable of producing near 100% extraction yields of a low-assay ore. Additionally, these processes have proven to be difficult and expensive for commercial application. Therefore, there has been a recognized need for an improved process for recovering cesium from pollucite in a highly purified form. The need for such a process improvement has been emphasized in recent years by the increasing uses of cesium and cesium compounds, and by the projected expansion of these uses in anticipated applications. (See Heindl, above cited, pages 528-532.)

All of the patents and publications mentioned above and throughout are incorporated in their entirety by reference herein.

SUMMARY OF THE PRESENT INVENTION

It is a feature of the present invention to eliminate or reduce the need for the use of acids when recovering a metallic element from ore or other material. Particularly, it is a feature of the present invention to preferably recover about 100% of at least one metallic element including excellent extraction from a low-assay ore. It is yet another feature of the present invention to recover at least one metallic element from ore or other material by reacting the ore or other material with at least one salt.

Additional features and advantages of the present invention will be set forth in part in the description which follows, and in part will be apparent from the description or may be learned by the practice of the present invention. The objectives and other advantages of the present invention may be realized and obtained by means of the elements and combinations particularly pointed out in the written description of the claims.

To achieve these and other advantages, and in accordance with the purposes of the present invention as embodied and broadly described herein, the present invention relates to a method for recovering at least one metallic element from ore or other material by reacting the ore or other material with at least one salt. The salt is capable of recovering at least one metallic element from the ore or other material to form a reaction product that includes at least one metallic element. The present invention also relates to recovering at least one metallic element from the reaction product.

The present invention also relates to a method of recovering at least one metallic element from ore or other material by reacting the ore or other material with at least one salt, to form a reaction product that includes at least one metallic element. The method also includes crushing the reaction product to form a crushed material, wherein the crushed material includes at least one metallic element, dissolving at least a portion of the crushed material in a solvent to make a solution, and optionally concentrating the solution, and recovering at least one metallic element from the ore or other material. A variety of salts capable of recovering at least one metallic element from ore or other material is contemplated and disclosed.

It is to be understood that both the foregoing general description and the following detailed description are exemplary and explanatory only and are intended to provide a further explanation of the present invention as claimed.

The accompanying figures which are incorporated in and constitute a part of this application, illustrate various aspects of the present invention and, together with the description, serve to explain the principles of the present invention.

Figure 1:
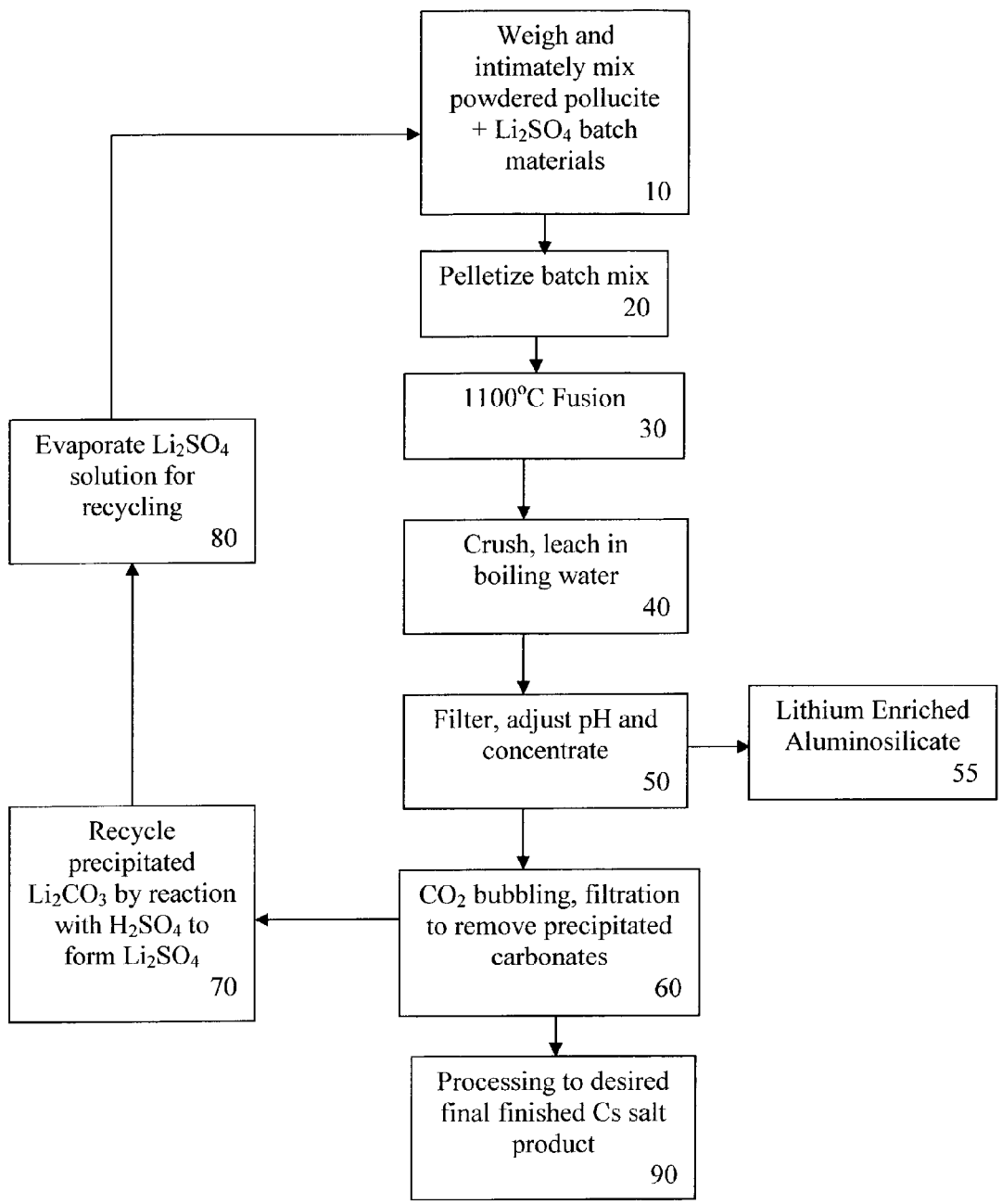
FIG. 1 is a process flow block diagram of a preferred embodiment for Cs recovery using lithium sulfate via clinker formation at about 1100° C.

The present invention may be more fully understood with reference to the accompanying figures. The figures are intended to illustrate exemplary embodiments of the present invention without limiting the scope of the invention.

DETAILED DESCRIPTION OF THE PRESENT INVENTION

The present invention relates to methods for recovering at least one metallic element, from sources like ore or other material. The method of the present invention includes reacting the ore or other material with at least one salt, which is capable of extracting/recovering the metallic element present in the ore. The reaction between the ore or other material and the salt forms a reaction product that includes the metallic element. The metallic element in the reaction product can then be recovered, for instance by dissolving at least one portion of the reaction product in a solvent to form a solution and optionally concentrating the solution.

In more detail, the metallic element can be in any form, such as in the form of a cation, salt, metal-containing compound, or metal, or combinations thereof. Preferably, the metallic element is at least one metal from Group I or Ia of the Periodic Table of the Elements, also known as the alkali metals. More preferably, the metallic element can be lithium, sodium, potassium, rubidium, cesium, and francium or combinations thereof. Most preferably, the metallic element is cesium, rubidium or combinations thereof. In a preferred example, and as described below, the metallic element is recovered as part of a sulfate, such as $Cs_2SO_4$ and/or $Rb_2SO_4$.

The starting ore used in the present invention can be any ore containing the desired metallic element. Preferably, the ore includes a metallic element from Group I or Ia of the Periodic Table of the Elements. In other words, the ore includes at least lithium, sodium, potassium, rubidium, cesium, and/or francium. Preferably, the ore includes cesium and/or rubidium. More preferably, the ore includes cesium, such as pollucite (a cesium aluminosilicate ore with the preferred formula of $CsAlSi_2O_6$). In most cases, the cesium aluminosilicates ore also includes rubidium. One example of an analysis of an ore having both cesium and rubidium is (wt. %): $Cs_2O$, 15.6; $Rb_2O$, 0.8; $Li_2O$, 1.0; $Na_2O$, 1.3; $K_2O$, 1.2; $Al_2O_3$, 15.9; $SiO_2$, 56.2; other components, 8.0. Other ore can have varying percents for each of these oxides, and in fact, can vary greatly from these numbers. The ore can be a low-assay ore. A low-assay ore includes less than 8-10 wt. % $Cs_2O$, such as about 5.82 wt. % $Cs_2O$.

The starting ore in the claimed invention can be in any shape or size. Preferably, the ore is in the form of a powder or a plurality of particles. Examples of such preferred starting ore powders include those wherein at least about 80% of the powders are about −200 mesh, and more preferably, having mesh sizes of about −200 mesh.

The starting salt used in the claimed invention can be any salt capable of recovering/extracting the metallic element from the ore or other material. Preferably, the salt is a sulfate salt. More preferably, the sulfate salt of the present invention is a sulfate salt from Groups I or Ia and II or IIb of the Periodic Table of the Elements, such as, for example, Li, Na, K, Rb, Cs, Mg, Ca, Sr, Ba sulfates, or any combinations thereof. Specific examples of the preferred sulfate salts that are commercially available are lithium sulfate salt and calcium sulfate salt. In the preferred embodiment, the source of lithium sulfate salt or calcium sulfate salt can be any source containing lithium sulfate salt or calcium sulfate salt. For example, one source of calcium sulfate can be any material having calcium sulfate ($CaSO_4$), including Plaster of Paris ($CaSO_4 \cdot \frac{1}{2}H_2O$) or gypsum ($CaSO_4 \cdot 2H_2O$).

The starting salt used in the present invention can be in any shape or size. Preferably, the salt is in a form that is capable of being in intimate contact with the ore. The salt can be in the form of powder or plurality of particles, or in solution form. Examples of such preferred starting salt powders include those wherein at least about 80% of the powders are about −200 mesh, and more preferably, having mesh sizes of about −200 mesh.

The solvent used for the purposes of the claimed invention can be any solvent capable of dissolving the product formed from the reaction between the salt and the ore. The solvent can have a pH ranging from about 0 to about 14. Preferably, the solvent is water. More preferably, the solvent is predominantly, if not exclusively, water.

Optionally, the present invention can also include at least one base. Preferably, the base of the present invention is an inorganic base. More preferably, the base of the present invention is derived from Group II of the Periodic Table of the Elements, such as, for example, Mg, Ca, Sr, Ba carbonates, hydroxides, oxides, or any combinations thereof. An example of such a base is Dolomite, Ca, $Mg(CO_3)$. Other examples of such bases include, but are not limited to, calcium oxide (CaO) and calcium hydroxide ($Ca(OH)_2$), which are commercially available.

Any convenient source of calcium oxide can be used. For example, crushed limestone ($CaCO_3$), which thermally decomposes at about 800° C. to form CaO can be used as a source material.

The method of the present invention can also include the use of at least one soluble carbonate source, wherein the at least one soluble carbonate can be at least one gas that promotes precipitation from the solvent containing the reaction product of the ore and the salt. Preferably, a gas that is capable of precipitating from the solvent is $CO_2$ gas. Optionally, a base may be added to maintain a suitable pH to ensure that precipitation occurs. For instance, to promote precipitation of $CaCO_3$, a base from Group I or II hydroxides (e.g., $Ba(OH)_2$ or CsOH) can be added before, during, or after to maintain the proper pH, (e.g., above 9.5).

If the ore is not of sufficient size to effectively be in intimate contact with the salt, the ore can be reduced into an effective size. In preparing the ore material, which is preferably pollucite, the solid ore material can be crushed to a sufficient size to produce more surface area so that the ore and the salt can be in intimate contact with each other. Preferably, the ore is crushed and/or milled into powder. The ore can be subjected to a screen in order to obtain uniform particle distribution, which is preferably about −200 mesh in size. If needed, the ore can be subjected to the crusher and/or mill two or more times in order to achieve the desired uniform particle distribution. Preferably, the ore can be subjected to milling in order to obtain a sufficient particle size, which is about −200 mesh. In particular, milling the ore under water gives a significant reduction in the required heating time. More preferably, the ore is ball-milled under water.

The salt (preferably sulfate salt) is commercially available. However, if the salt is not of sufficient size to preferably be in intimate contact with the ore, the salt can be reduced into an effective size. Alternatively, the salt can be in solution. In preparing the salt, which preferably is a sulfate salt, the salt can be subjected to a hydrating process in order to embrittle the salt for purposes of crushing the salt into powder to produce more surface area. The powdered salt can be subjected to a screen in order to obtain uniform particle distribution, which is preferably about −200 mesh in size. If needed, the salt can be subjected to the crusher two or more times in order to achieve the desired uniform particle distribution. Preferably, the salt can be subjected to milling (e.g., ball milling) in order to obtain sufficient particle size, which is about −200 mesh. In particular, milling the salt under water gives a significant reduction in the required heating time. More preferably, the salt is ball-milled under water.

In the present invention, in order to recover at least one metallic element (e.g., cesium or rubidium) from ore or other material, such as pollucite, the ore preferably is mixed with a salt, preferably sulfate salt, such as lithium sulfate salt or calcium sulfate salt. Pollucite as referenced herein typically contains about 15 wt. % $Cs_2O$, but it is understood that pollucite and other sources of cesium can greatly vary and other ratios described throughout can also vary and the percentage of ratios is for exemplary purposes only. The ore and the salt can be mixed together in any effective amount. Again, the salt can be in solution. Preferably, the ore and the salt are mixed so that the salt is in intimate contact with the ore. Preferably, the ore and salt are ball-milled under water to form a slurry mixture. Optionally, for convenience in handling, the mixture of the starting materials can be pelletized, optionally using a binder that is burned off during firing. The starting ore (e.g. pollucite) and the salt (e.g. sulfate salt) can be present in any ratio. Preferably, the ore/salt ratio is about 30 to about 85 wt. % ore (e.g., pollucite) and about 15 to about 70 wt. % salt (e.g., sulfate salt, preferably $CaSO_4$ or $Li_2SO_4$). If $BaSO_4$, the weight percent can be up to about 89% as an example. More preferably, the ore to salt ratio is about 30 to about 70 wt. % ore (e.g., pollucite) and about 70 to about 30 wt. % salt (e.g., sulfate salt). As an option, at least one base, such as CaO, $Ca(OH)_2$, calcium carbonate, or combinations thereof can also be added to the mixture of the ore and the salt. Thus, the ore, salt, and base (e.g., limestone) can be ball-milled together under water to form a slurry mixture. In this preferred method, the weight ratio of the sulfate salt (e.g., calcium sulfate salt) to base (e.g., calcium oxide) to ore (e.g., pollucite) should be adequate to produce maximum cesium recovery. Preferably, the ore-sulfate salt-base ratio is about 30 to about 80 wt. % ore (e.g., pollucite), about 15 to about 70 wt. % sulfate salt (e.g., calcium sulfate), and 0 to about 50 wt. % base (e.g., calcium oxide). More preferably, the ore-sulfate salt-base ratio is about 40 to about 45 wt. % ore, about 15 to about 20 wt. % sulfate salt, and about 40 to about 45 wt. % base. Most preferably, the ore-sulfate salt-base ratio is about 40 wt. % ore, about 20 wt. % sulfate salt, and about 40 wt. % base (40:20:40).

The salt and ore mixture, or alternatively the salt, ore, and base mixture, can then be heated, preferably in an appropriate furnace, to a temperature sufficient for a heat-induced reaction to take place with the ore (e.g., pollucite) and the salt (e.g., sulfate salt). Preferably, the mixture is heated so that at least a partial ionic exchange occurs between the ore and salt. Preferably, the mixture is heated from about 500° C. to about 1650° C. and the mixture is preferably heated at the peak temperature for about 1 minute to about 120 minutes or more. Other effective temperatures and times can be used.

In one example, wherein the ore includes both cesium and rubidium, the method for extracting cesium and rubidium involves heating an intimate mixture of powdered cesium-bearing aluminosilicate ore with either powdered lithium sulfate ($Li_2SO_4$) or lithium sulfate monohydrate ($Li_2SO_4.H_2O$) to a temperature of 1100° C. or higher. A molten sulfate phase is formed at temperatures above 856° C. (the melting point of $Li_2SO_4$). The molten sulfate phase then undergoes an ion-exchange reaction with the pollucite ore. During the reaction, cesium and rubidium ions migrate into the molten sulfate phase, and lithium ions migrate into the aluminosilicate phase. The product after cooling is a fused mass containing immiscible sulfate and aluminosilicate phases, with the sulfate phase being enriched in cesium and rubidium, and also containing residual lithium.

Depending on the starting material composition, e.g., sulfate salt (e.g., lithium sulfate salt or calcium sulfate salt) and firing temperature, a reaction occurs to form, for instance, a clinker-type product, having a sintered solid aluminosilicate material containing molten Cs-rich sulfate material in the pores, or a fully molten material having Cs-rich sulfate and Ca-rich aluminosilicate liquids that are immiscible, thus forming a two molten phases. For example, if lithium sulfate salt is mixed with pollucite and heated to a temperature close to about 1300° C., the mixture becomes fully molten and contains immiscible sulfate and aluminosilicate liquids. Because of the high temperature, a suitable reactor can be used, such as a rotary kiln, with a suitable refractory lining that can operate on a continuous or non-continuous basis. As an example, ion exchange of cesium and lithium or cesium, rubidium, and lithium between the two molten phases can occur relatively rapidly as a result of batch stirring from kiln rotation.

Also, for instance, if the same mixture of pollucite and lithium sulfate is heated at about 1100° C., the processing of the feedstock can be on a continuous basis using an air-atmosphere tunnel or moving belt kiln. For example, the feedstock can be on an electric kiln powered by silicon carbide heating elements. In this example, the resulting fused product can be a sintered solid material (a "clinker") that contains previously molten $(Cs, Li)_2SO_4$ or $(Cs, Rb, Li)_2SO_4$ in the pores. The time required to obtain maximum Cs or Cs and Rb recovery can depend on the Li and the Cs and/or Rb diffusion rate between the solid aluminosilicate and the molten sulfate phases. Preferably, the time to obtain maximum Cs or Cs and Rb recovery is from about 30 to about 60 minutes.

The following generalized equations illustrate one embodiment of the cesium or cesium and rubidium migration to the sulfate phase by exchanging ions with the lithium. $CsAlSi_2O_6 + n\ Li_2SO_4 \rightarrow (Cs,Li)_2SO_4 + Li$ aluminosilicate byproduct; and $(Cs, Rb)$ aluminosilicate$+Li_2SO_4 \rightarrow (Cs, Rb, Li)_2SO_4+Li$-enriched aluminosilicate byproduct.

In the above example, $Cs_2 SO_4$ and/or $Li_2SO_4$ can individually be formed.

This Li aluminosilicate can be a suitable replacement for commercial Spodumene and/or Petalite.

In another example, if the sulfate salt is calcium sulfate salt instead of lithium sulfate salt and the ore is pollucite, the mixture of pollucite and calcium sulfate salt can be heated to a suitable temperature, e.g., about 1650° C. Preferably, the heat-induced reaction occurs at a temperature of from about 1200° C. to about 1650° C. The temperature is preferably maintained at the peak temperature for a sufficient period of time for a reaction to take place, preferably for about 30 minutes. This reaction can take place in a crucible, or other suitable reactor.

The addition of at least one base to the mixture of the ore and salt can reduce the temperature needed for the reaction to occur at a commercially reasonable reaction rate. Lower temperatures and higher CaO contents in the starting materials can be beneficial for two reasons. First, with CaO compositions greater than about 20 wt. %, there is little propensity for any gaseous sulfur oxide emissions to be formed by thermal decomposition of $CaSO_4$. Without a lime, such as CaO, the $CaSO_4$ will decompose to problematic gaseous sulfur oxide. Second, low fusion temperatures and high CaO contents tend to form the clinker-type product, which can have important implications for any commercial process for Cs extraction from pollucite.

Preferably, the mixture includes ore, which can be pollucite; a salt, which can be calcium sulfate; and at least one base, which can be calcium oxide, calcium hydroxide, calcium carbonate, or combinations thereof. In this example, a mixture of calcium oxide, calcium sulfate, and pollucite can be heated to a sufficient temperature and for a sufficient time to form a binary Cs, Ca or Cs/Rb, Ca sulfate phase that melts at relatively low temperatures. The presence of a liquid phase can then accelerate further reaction between the molten sulfate phase and the remaining solid materials, forming an equilibrium mixture that contains $Cs_2Ca_2(SO_4)_3$ or $(Cs, Rb)_2Ca_2(SO_4)_3$ depending on the composition of the ore and Ca silicates and/or Ca aluminosilicates. One advantage of using higher fusion temperatures is to accelerate the reaction. Preferably, the CaO—$CaSO_4$-pollucite mixture is heated at a temperature of from about 1000 to about 1350° C., and more preferably, from about 1000 to about 1200° C. At temperatures below about 1200° C., the $SO_x$ evolution from sulfate breakdown is negligible or zero. Furthermore, at temperatures below about 1400° C., the reaction products are sintered solid materials, rather than melts, so that refractory corrosion is essentially eliminated.

Preferably, the CaO—$CaSO_4$-pollucite mixture is heated at a peak temperature for a sufficient time for a reaction to occur, preferably for about 1 minute to about 120 minutes or more. The mixture can be heated at a peak temperature of from about 1100° C. to about 1350° C. for about 1 minute to about 120 minutes. For example, the mixture can be heated at a peak temperature of from about 1000° C. to about 1150° C. for about 20 to about 60 minutes.

A typical reaction when extracting cesium might be:

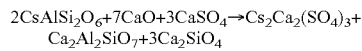
$$2CsAlSi_2O_6 + 7CaO + 3CaSO_4 \rightarrow Cs_2Ca_2(SO_4)_3 + Ca_2Al_2SiO_7 + 3Ca_2SiO_4$$

pollucite lime anhydrite binary sulfate gehlenite larnite

A typical reaction when extracting cesium and rubidium might be:

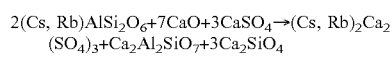
$$2(Cs, Rb)AlSi_2O_6 + 7CaO + 3CaSO_4 \rightarrow (Cs, Rb)_2Ca_2(SO_4)_3 + Ca_2Al_2SiO_7 + 3Ca_2SiO_4$$

The product of the ore and salt mixture reaction, or ore, salt, and base mixture reaction, (reaction product, clinker or molten) can be crushed. Preferably, the reaction product is crushed to a size suitable to recover the maximum amount of cesium or cesium and rubidium. Typically, a smaller-sized reaction product results in a higher amount of cesium or cesium and rubidium recovery for a given reaction time. Preferably, the size of the reaction product is less than −200 mesh. Preferably, the reaction product is reduced in size by using the same method described earlier with respect to reducing the size of the starting ore and salt. A portion of the reaction product (e.g., the dissolvable portion) can then be dissolved in a solvent. The preferred method for dissolving the reaction product is by a leaching process. Preferably, the solvent is water and the temperature of the reaction product in the solvent is increased to above the ambient temperature. The solvent can be aqueous-based liquids. More preferably, the temperature is increased to near or at the boiling temperature of the solvent.

In the above example, cesium calcium sulfate ($Cs_2Ca_2(SO_4)_3$) or cesium, rubidium calcium sulfate ($(Cs, Rb)_2Ca_2(SO_4)_3$) can react with water to form a $Cs_2SO_4$ or $(Cs, Rb)_2SO_4$ solution, respectively, leaving a sparingly soluble $CaSO_4$ residue:

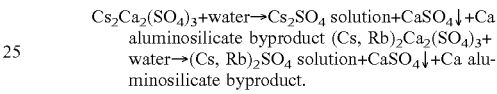
$Cs_2Ca_2(SO_4)_3 + water \rightarrow Cs_2SO_4$ solution$+ CaSO_4\downarrow + Ca$ aluminosilicate byproduct $(Cs, Rb)_2Ca_2(SO_4)_3 + water \rightarrow (Cs, Rb)_2SO_4$ solution$+ CaSO_4\downarrow + Ca$ aluminosilicate byproduct.

This byproduct can have various useful applications, such as in the cement industry. In the above reactions, individual metal salts or compounds thereof can be formed.

Should a base, such as calcium oxide, calcium hydroxide, calcium carbonate, or combinations thereof be added to the mixture of ore and the sulfate salt, the base can elevate the pH of the solution which may assist in precipitation. The base may assist in reducing the melting temperature of the mixture. Boiling and evaporation of the solution can cause further precipitation of the calcium sulfate, thus further concentrating the solution. Optionally, a compound or other additive can be added to the solution to cause further precipitation of metal carbonate (i.e., lithium carbonate if lithium sulfate salt is used or calcium carbonate if calcium sulfate salt is used) and any remaining $Ca^{2+}$ as $CaCO_3$. The optional solution that can be added to cause further precipitation of metal carbonate is typically, at least one soluble carbonate source. Preferably, at least one soluble carbonate source is in a gas form. More preferably, this gas is contacted with the solution by bubbling through the solution using conventional techniques. More preferably, the gas is a $CO_2$ gas, which is bubbled through the solution. Preferably, the $CO_2$ gas is bubbled through the solution while the solution has a temperature above the ambient temperature. This process may lower the pH of the solution and may cause precipitation of metal carbonate ($Li_2CO_3$ if lithium sulfate salt is used, or $CaCO_3$ if calcium sulfate salt is used), which has a relatively low solubility in water. Optionally, at least one base may be added to maintain a suitable pH to ensure that precipitation occurs. For instance, to promote precipitation of $CaCO_3$, a base from Group I or II hydroxides (e.g., Cs(OH), Ba(OH)$_2$) can be added before, during, or after to maintain the proper pH, (e.g., above 9.5).

The solubilities of $Li_2CO_3$, $Cs_2CO_3$, $Rb_2CO_3$, and $CaCO_3$ in water at 100° C. are 7.2 g/L, >2600 g/L, >4500 g/L, and 0.018 g/L, respectively. Thus, virtually all of the calcium ions and most of the lithium carbonate may be removed by bubbling carbon dioxide through the solution, followed by filtration to remove the precipitated lithium and calcium carbonates. Optionally, at least one base may be added to maintain a suitable pH to ensure that precipitation occurs. For instance, to promote precipitation of $CaCO_3$, a base from Group I or II hydroxides (e.g., $Cs(OH)$, $Ba(OH)_2$) can be added before, during, or after to maintain the proper pH, (e.g., above 9.5). Bubbling of gas, such as carbon dioxide, can be discontinued when the calcium and lithium carbonates are precipitated which can coincide when the pH level falls to about 9.5, to preferably avoid formation of soluble lithium bicarbonate ($LiHCO_3$) if lithium sulfate salt is used and soluble calcium bicarbonate ($Ca(HCO_3)_2$) if calcium sulfate is used. Once the concentration of the solution has reached the desired concentration due to the use of one or more of the above described methods, any conventional separation process can be used to remove the gangue material/precipitate. Depending on the starting salt material, the gangue material/precipitate can vary. For example, if lithium sulfate salt is used as the starting salt, then the precipitate is $Li_2CO_3$; however, if the starting salt is a salt such as calcium sulfate salt, then the precipitate is $CaCO_3$. One method to remove these gangue material/precipitates is by a separation process, and more preferably by a solid/liquid separation (SLS) process, such as filtration.

FIG. 1 illustrates an exemplary process of recovering a metallic element, such as cesium and rubidium, from ore or other material, such as pollucite, using lithium sulfate salt. According to this example, as shown in FIG. 1, at step 10, the finely ground pollucite and lithium sulfate ($Li_2SO_4$) are intimately mixed in an appropriate weight ratio as batch materials. For convenience in handling, the mixture of the pollucite and the $Li_2SO_4$ can be pelletized with or without using a binder that is burned off during firing. At step 20, the mixed batch is pelletized. In a preferred embodiment, at step 30, the feedstock, which includes the pollucite and the lithium sulfate, is heated at about 1100° C. for a sufficient period of time for a reaction to take place, preferably for about 1 minute to about 120 minutes, and more preferably for about 45 minutes. The processing of feedstock could be on a continuous basis using an air atmosphere tunnel or moving belt kiln. Once the reaction has been completed at step 30, the reaction product of step 30 is allowed to cool.

At step 40, the cooled reaction product of step 30 is crushed, preferably to a size sufficient to yield optimum cesium extraction. The crushed reaction product of step 40 is then leached in a solvent, preferably water, or more preferably, in heated water. The solution created at step 40 is then filtered at step 50 to separate the lithium enriched alumina silicate byproduct from the soluble sulfate filtrate. The enriched byproduct, at step 55, can be further processed, as required, to a viable commercial substitute for Spodumene and Petalite, presently being used in ceramic and glass formulations. Optionally, at step 50, $Ba(OH)_2$ or any other suitable compositions, including alkali hydroxides, capable of increasing the pH can be added to the solution to increase the pH of the $(Li, Cs)_2 SO_4$. Preferably, the pH is increased to above about 13. At step 60 of this process, $CO_2$ is bubbled through the optionally pre-concentrated and pH adjusted solution, and causes precipitation of the $Li_2CO_3$ and of any remaining $Ca^{2+}$ as $CaCO_3$, if calcium was previously added at step 50 as a base. At step 60, a filtration process is used to remove the precipitated $Li_2CO_3$, and $CaCO_3$ if a calcium base was previously added at step 50.

The recovered, predominantly $Cs_2SO_4$ filtrate extracted at step 90 is then prepared for further downstream processing to the desired final cesium salt product by processing techniques commonly known in the art. At step 70, the precipitated $Li_2CO_3$ can be recycled by reacting it with $H_2SO_4$ to form $Li_2SO_4$ solution plus $CaSO_4.2H_2O$ provided a calcium base were added in step 50. The latter is relatively insoluble and can be removed by filtration. Finally, at step 80, the remaining solution can be evaporated, forming a dry $Li_2SO_4.H_2O$ salt or a concentrated $Li_2SO_4$ salt solution for use in further feedstock preparation.

Figure 2:
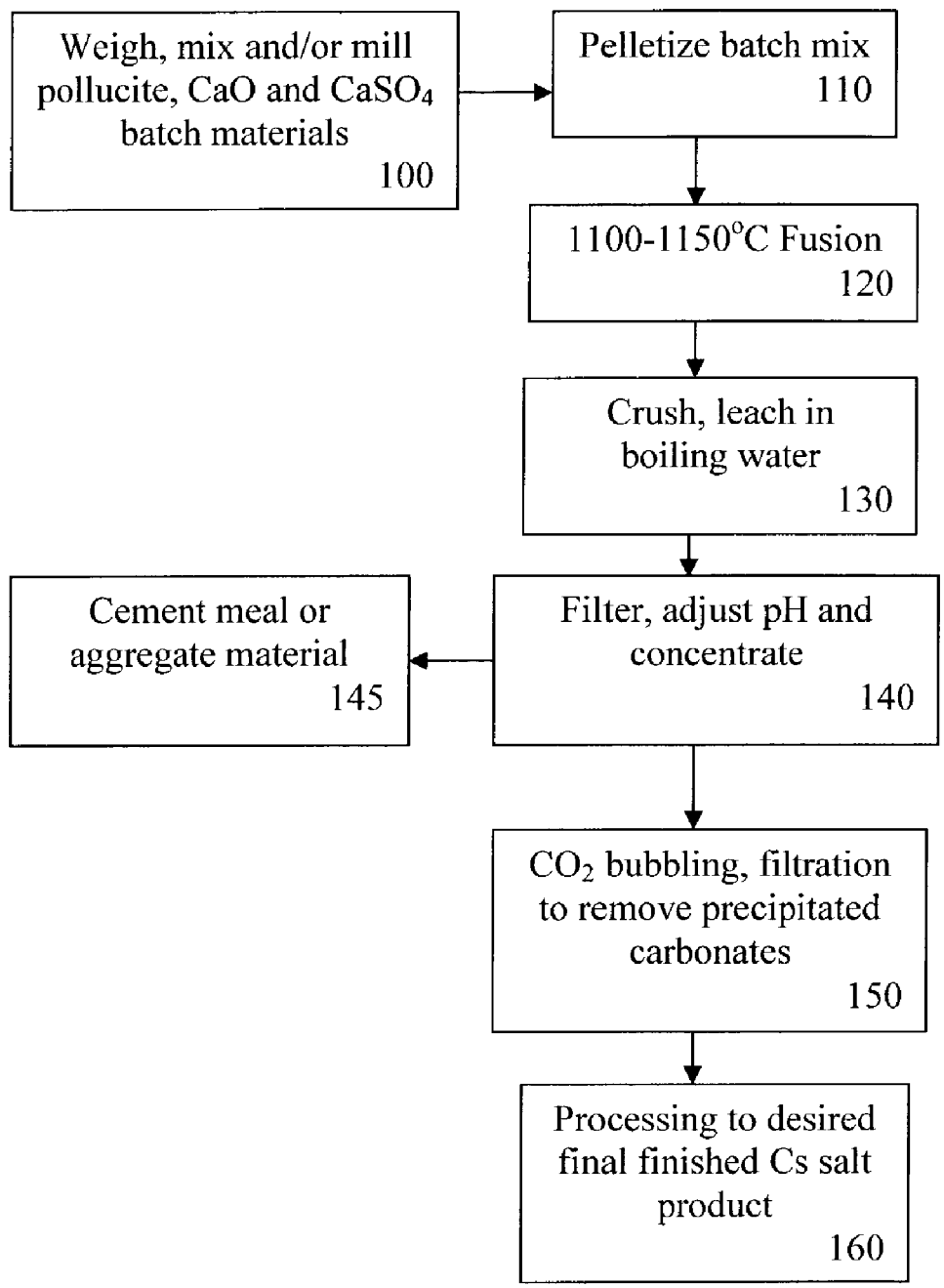
FIG. 2 is a process flow block diagram of a preferred embodiment using a pollucite/CaO/CaSO_4 mixture via clinker formation at about 1100° to about 1150° C.

FIG. 2 illustrates an exemplary process for the recovery of a metallic element, such as cesium and rubidium from ore, such as pollucite, or other material using calcium sulfate salt and calcium oxide base. In this example, as shown in FIG. 2, at step 100, the pollucite, CaO, and $CaSO_4$ are intimately mixed in an appropriate weight ratio as a batch material. At step 110, the batch material of step 100 can be pelletized for ease in handling with or without using a binder that would be burned off during firing. The pelletized batch mixture of step 110 is then sent to a furnace as feedstock. At step 120, the feedstock is heated at a temperature of about 1100° C. to about 1150° C. for a sufficient time for a reaction to occur, preferably the reaction time is about 45 minutes. The processing of the feedstock could be on a continuous basis using an air-atmospheric tunnel or moving belt kiln. The heat at step 120 produces a reaction product that is then allowed to cool.

At step 130, the cooled reaction product of step 120 is crushed, preferably to a size suitable to recover the maximum amount of Cs. The crushed reaction product is then leached in water. Preferably, the water has a temperature of about 100° C. at atmospheric pressure. At step 140, the solution of step 130 is filtered, where the primary filtrate is combined with washings of the filter residue to obtain maximum Cs recovery. The recovered residue (shown at step 145) having a composition and structure quite similar to currently commercialized cement meal or aggregate material that can be further processed to a commercially desired quality product. Prior to or after filtration, the solution is boiled and/or evaporated to produce further precipitation of $CaSO_4.2H_2O$. At step 150, the solution can be filtered, pH adjusted upwards using a suitable base and carbon dioxide bubbled through the solution of step 140 to cause precipitation of any insoluble species remaining like $Ca^{2+}$ as $CaCO_3$. Finally, at step 160, a filtration process is used to remove the precipitated $CaCO_3$, leaving a concentrated $Cs_2SO_4$ sulfate solution.

The recovered, predominantly $Cs_2SO_4$ filtrate extracted at step 160 is then prepared for further downstream processing to the desired final cesium salt product by processing techniques commonly known in the art.

Figure 3:
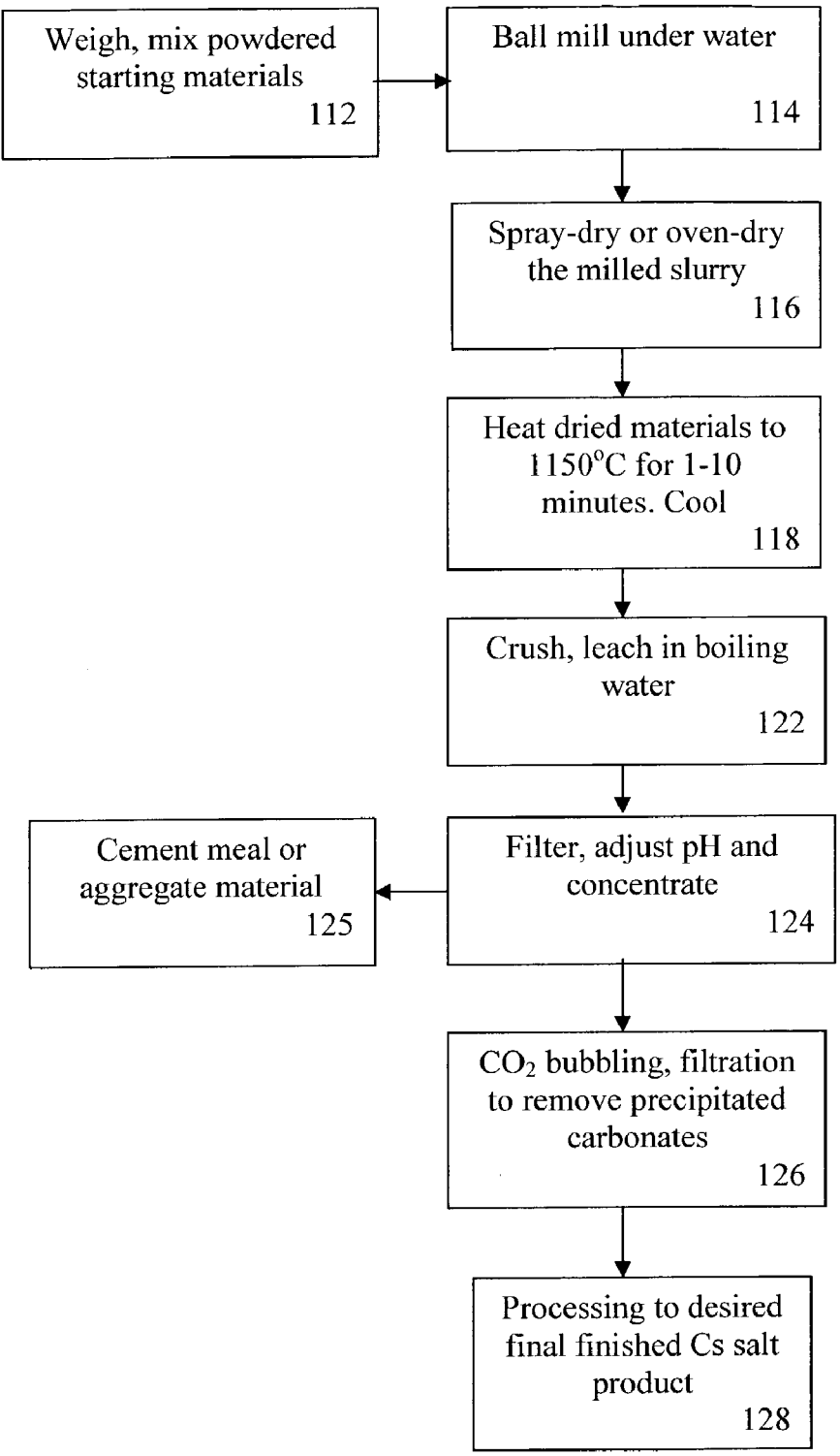
FIG. 3 is a process flow block diagram of a preferred embodiment using pollucite/CaO/CaSO_4 mixture, wherein the mixed powder starting material is ball-milled under water.

FIG. 3 illustrates an exemplary process for recovering a metallic element, such as cesium or rubidium, from ore, such as pollucite, or other material using calcium sulfate and calcium oxide base. According to this example, either 29.3 wt. % pollucite ore, 52.2 wt. % limestone, and 18.5 wt. % gypsum; or 30.1 wt. % pollucite ore, 53.8 wt. % limestone, and 16.1 wt. % Plaster of Paris are mixed at step 112 of FIG. 3. At step 114, either of the two mixtures is ball-milled under water to produce a slurry containing micron-sized particulars. At step 116, the slurry is spray-dried or oven-dried and then heated to 1150° C. using a furnace such as tunnel, moving-belt or rotary kiln. At step 118, the spray-dried material is then held at 1150° C. for a short time, for example as few as 1-10 minutes, before cooling the material. The resulting heat-treated material is then crushed at step 122 to a fine particle size (e.g., to pass a 150-mesh sieve) to facilitate leaching, and is then leached in water. Preferably, the water has a temperature of about 100° C. at atmospheric pressure. At step 124, the solution of step 122 is filtered, where the primary filtrate is combined with washings of the filter residue to obtain maximum Cs recovery. At step 125, the recovered residue having a composition and structure quite similar to currently commercialized cement meal can be further processed to a commercially desired quality product. Prior to or after filtration, the solution is boiled and/or evaporated to produce further precipitation of $CaSO_4.2H_2O$. At step 126, the solution can be filtered, pH adjusted upwards using a suitable base and carbon dioxide bubbled through the solution of step 124 to cause precipitation of any insoluble species remaining like $Ca^{2+}$ as $CaCO_3$. Finally, at step 128, a filtration process is used to remove the precipitated $CaCO_3$, leaving a concentrated $Cs_2SO_4$ sulfate solution.

The recovered, predominantly $Cs_2SO_4$ filtrate extracted at step 128 of FIG. 3 is then prepared for further downstream processing to the desired final cesium salt product by processing techniques commonly known in the art.

The present invention will be further clarified by the following examples, which are indicated to be exemplary of the present invention.

EXAMPLES

Example 1

Laboratory fusion trials were performed using varying pollucite/lithium sulfate ratios and fusion temperatures of either 1100° C. (giving a clinker product) or 1300° C. (giving an immiscible two-phase melt). In each trial, the test sample was held at the peak temperature for 30 minutes before being removed from the hot furnace, and then cooled and crushed to a fine powder. The crushed fusion products were used for leach tests in water, and chemical analyses were made of the resulting solutions and filter residues.

The analysis results were used to determine:
(i) % Cs recovery from the pollucite ore; and
(ii) the compositions of the filter residues (i.e., Li-rich aluminosilicate byproduct).

Figure 4:
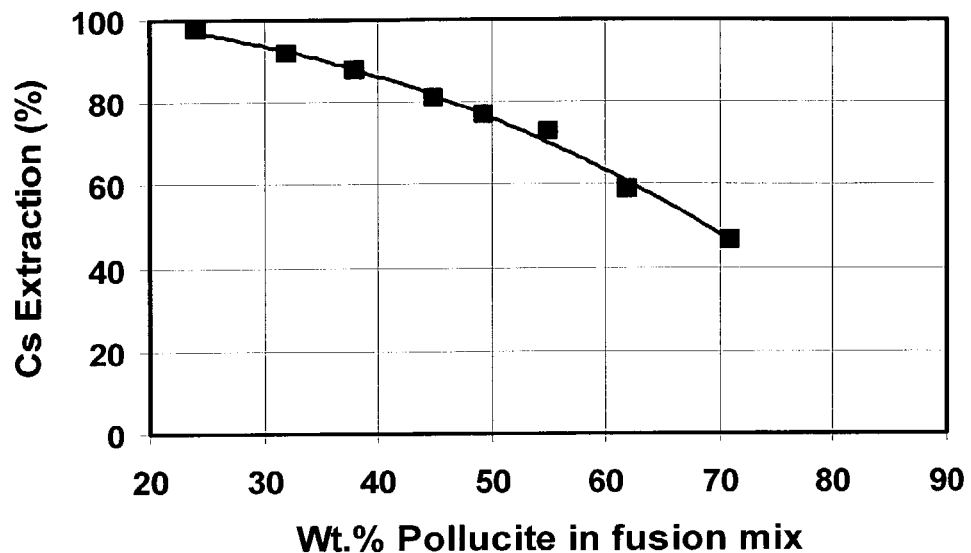
FIG. 4 is a graph of the weight percentage of cesium extraction from the pollucite when heating the pollucite and the lithium sulfate at about 1300° C.
Figure 5:
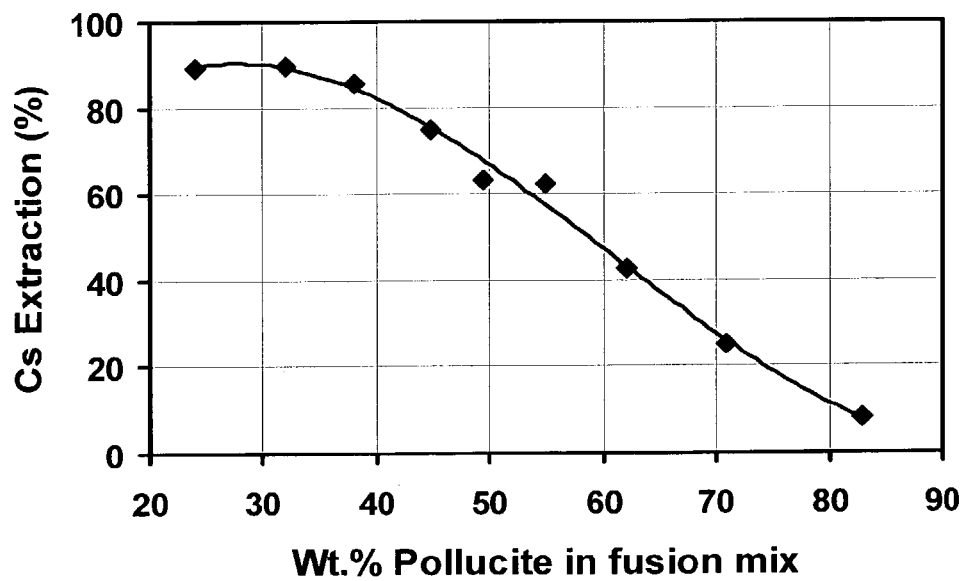
FIG. 5 is a graph of the weight percentage of cesium extraction from the pollucite when heating the pollucite and the lithium sulfate at about 1100° C.

Mass balance calculations, whereby the compositions of the leach solutions and filter residues are compared to the starting material compositions, were used to verify the accuracy of the chemical analyses. The results are summarized in FIGS. 4 and 5. In general, the % Cs recovery from pollucite decreased as the concentration of pollucite in the starting material increased. Cs extractions of approximately 80% were obtained with 40-45 wt. % pollucite in the starting material.

It should be noted that the pollucite material used in these trials was about 80% minus 200 mesh (<75 μm) milled ore containing about 15 wt. % Cs. Based on the results obtained with subsequent pollucite/CaO/CaSO$_4$ fusion mixtures, it is likely that with both the 1300° C. melt and the 1100° C. clinker product, greater Cs yields would be obtained if a finer (lower particle size) pollucite feedstock and/or longer reaction times had been used. Subsequent trials using a refined wet milling and pelletizing techniques increased the cesium and rubidium extraction at 1100° C. to 100% using a ratio of 62 wt. % $Li_2SO_4.H_2O$ to 38 wt. % pollucite.

Example 2

Laboratory trials have been performed using fusion temperatures of from about 1000° C. to about 1500° C., and using the following composition ranges (weight %): pollucite, 30-80%; $CaSO_4$, 15-70%; and CaO, 0-40%. In the trials, the starting materials have been initially pressed into pellets using a wax binder. Programmed heating/cooling to the test temperature (1000° C.-1350° C.) at 10° C./min has been used to simulate the movement of the pelletized raw materials through a tunnel or a moving belt kiln. Furthermore, compositions that had been shown to form a clinker product were fired on a platinum sheet.

The fused samples were crushed to a fine (−200 mesh) powder. The crushed fusion products were used for leach tests in water, and after filtration, chemical analyses were made of the resulting solutions to determine the % Cs extraction. In some cases, analyses of the filter residues have also been performed to allow mass-balance calculations to be made. X-ray diffraction (XRD) analyses of the crushed fused products and the filter residues have been used to identify the reaction products.

The experimental results indicate that, using pollucite ore milled to 100% below 200 mesh and hold times of 45-60 minutes, the % Cs extraction can be increased to about 100% at fusion temperatures as low as from about 1100° C. to about 1150° C., with essentially no $SO_2$ off-gas emissions.

Example 3

Fusion experiments and XRD results indicate that >90% Cs recoveries can be obtained at temperatures of from about 1100° C. to about 1150° C. using finer (i.e. smaller particle size) milled pollucite in the starting material. In these experiments, the pollucite powder was sieved to remove the +200 mesh pollucite fraction. The corresponding Cs recoveries, calculated from analysis data from boiling water leach tests, are shown below:

| Composition | Fusion temperature | Time at temperature | % Cs recovery | Fusion product type |
|---|---|---|---|---|
| Ca-25, −200 mesh pollucite | 1100° C. | 45 min | 97.3 | Clinker |
| Ca-25, −200 mesh pollucite | 1100° C. | 60 min | 97.7 | Clinker |
| Ca-25, −200 mesh pollucite | 1150° C. | 45 min | 97.3 | Clinker |
| Ca-25, −200 mesh pollucite | 1150° C. | 60 min | 101.5 | Clinker |

Figure 6:
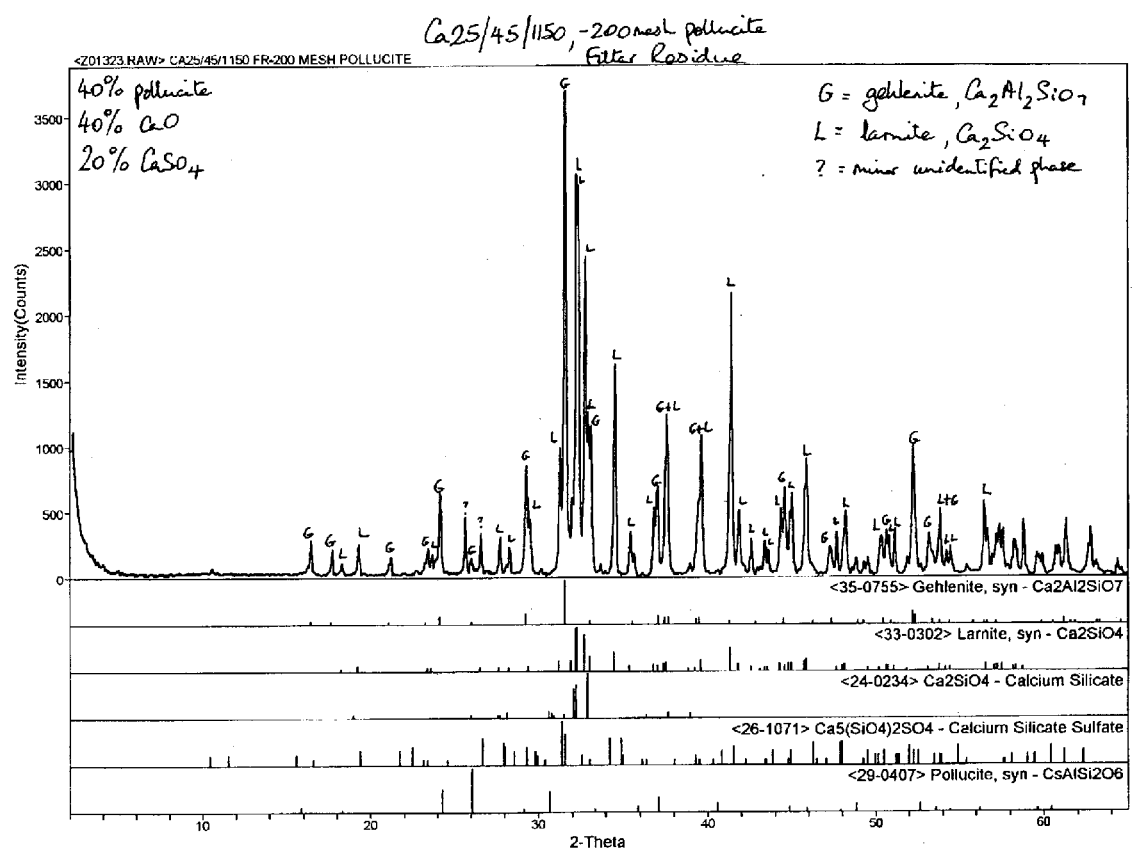
FIG. 6 is an XRD trace for filter residue after leaching a −200 mesh pollucite Ca-25 clinker that has been heated for forty-five minutes at 1150° C.

Leach tests in boiling water were performed with this sample. The residue, (byproduct) after filtration and washing, was then dried and analyzed by XRD. FIG. 6 shows the XRD trace for the filter residue, showing peaks for gehlenite, larnite and a minor unidentified phase, but with all peaks for $Cs_2Ca_2(SO_4)_3$ and pollucite being absent. Thus, the XRD results indicate very high Cs recoveries from the leaching of this sample, which were confirmed by analyses, as shown in the above table.

Figure 7:
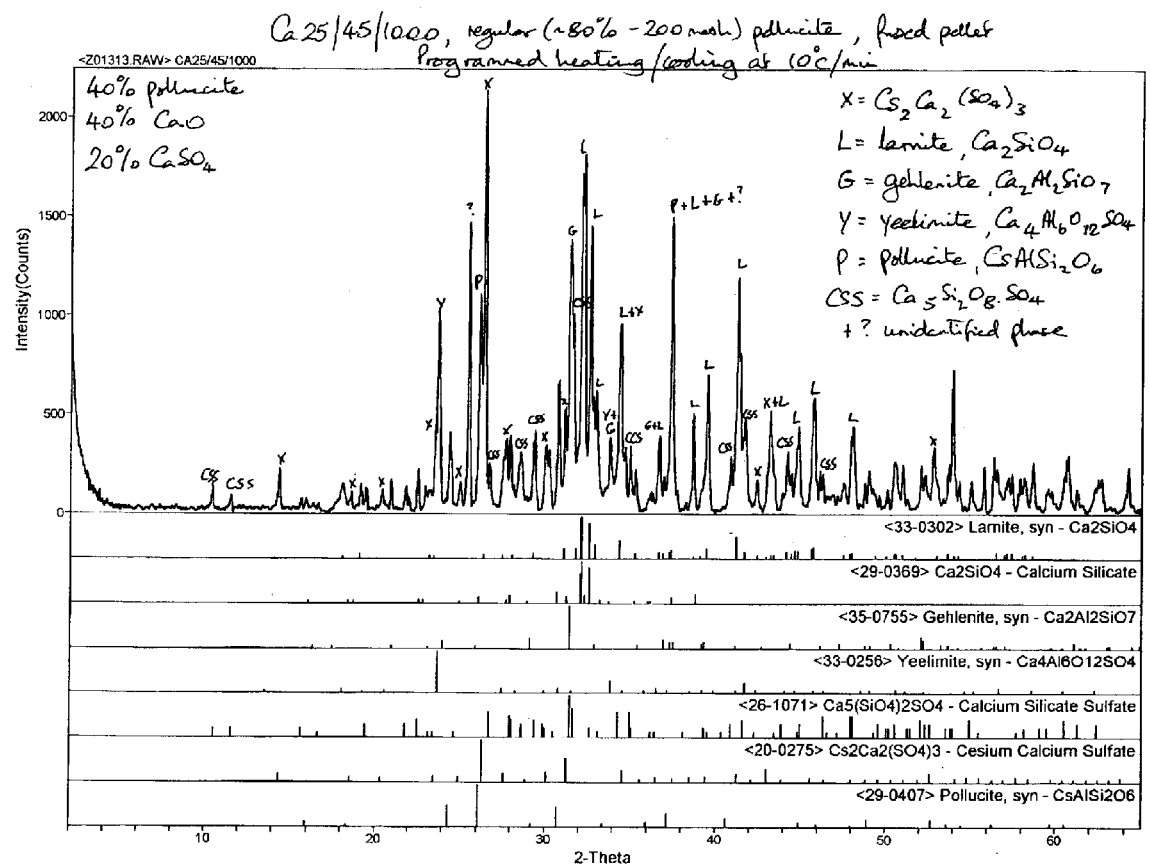
FIG. 7 is the XRD traces obtained for Ca-25 after 30 minute fusions to form clinkers at 1000° C.
Figure 8:
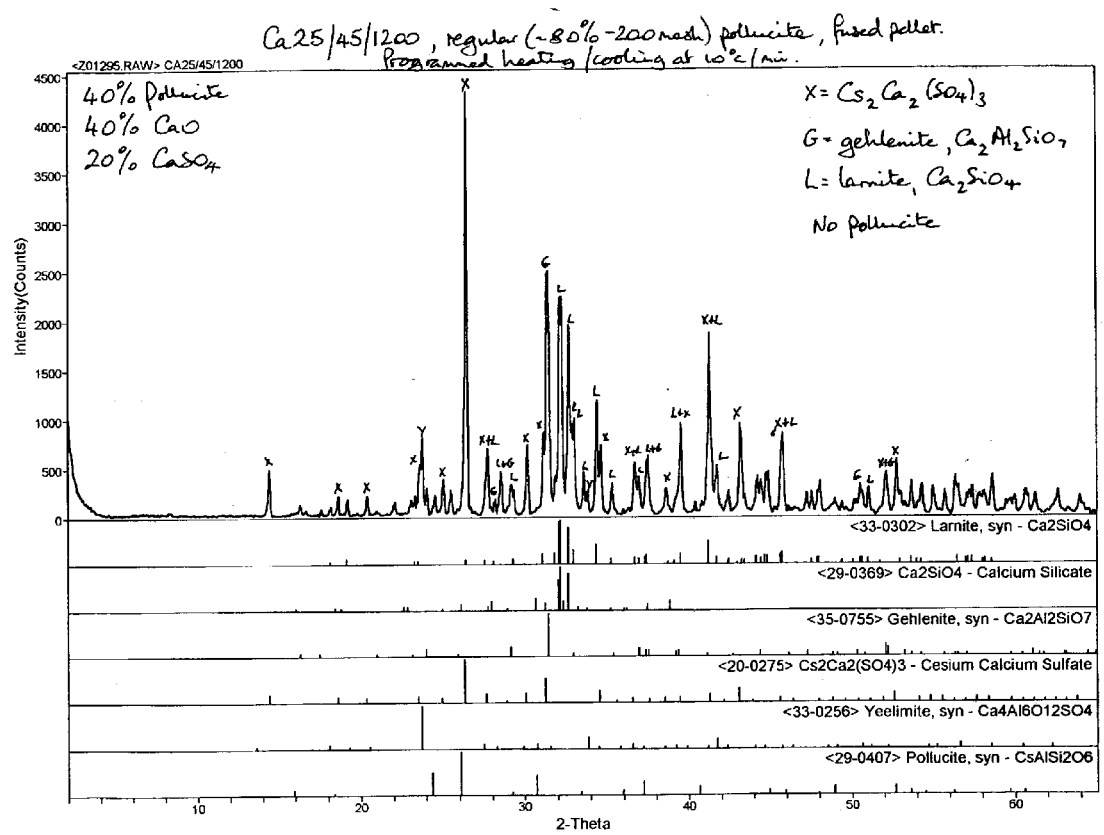
FIG. 8 is the XRD traces obtained for Ca-25 after 30 minute fusions to form clinkers at 1200° C.

Based on the results obtained with the mix of Ca-25, the reaction to form $Cs_2Ca_2(SO_4)_3$ is obviously favored thermodynamically. Thus, the only advantage to using higher fusion temperatures is to accelerate the reaction. This is illustrated in FIGS. 7 and 8, which show the XRD traces obtained for Ca-25 after 30-min. fusions to form clinkers at 1000° C. and 1200° C., respectively. After 30 min. at 1000° C., the pollucite has only partially reacted, forming $Cs_2Ca_2(SO_4)_3$ together with numerous other phases. After 30 min. at 1200° C. however, complete pollucite reaction has occurred, forming $Cs_2Ca_2(SO_4)_3$, gehlenite and larnite.

Again, the reaction dependence on time at fusion temperature is purely kinetic (i.e., longer times allow the reaction to move towards completion). Based on numerous trials with a mix of Ca-25 and compositions close to it, the optimum time and temperature for $Cs_2Ca_2(SO_4)_3$ production has been found to be from about 45 to about 60 minutes at a temperature of from about 1100° C. to about 1150° C.

Example 4

A mixture of 13.3 g of pollucite ore, plus 7.1 g of commercial Plaster of Paris, plus 23.8 g of reagent grade calcium carbonate (Anachemia) was prepared. This mixture is equivalent to 40 wt. % pollucite ore, 40 wt. % CaO, 20 wt. % $CaSO_4$ after thermal decomposition during subsequent heating. The mixture was ball-milled with 67 mL of pure water for 6 hours, using alumina grinding media, to produce a fluid slurry. Note that during milling, the Plaster of Paris became further hydrated to form gypsum.

After milling, the resulting slurry was spray dried to form a coarse powder containing agglomerates of intimately mixed micron-sized reactants. The powder was heated in a platinum crucible, using a programmable electric furnace. The furnace was heated from room temperature to 1150° C. at 10° C./min, and was held at 1150° C. for 5 minutes, and then cooled to room temperature at a rate of 10° C./min. The reaction product was a loosely sintered powder that came away cleanly from the crucible. The sintered powder was then crushed to pass a 200-mesh sieve.

A portion of the reaction product was used for powder X-ray diffraction (XRD) analysis to identify the component phases, which were $Cs_2Ca_2(SO_4)_3$, gehlenite, and larnite. No XRD peaks corresponding to pollucite were observed, indicating that all pollucite in the original ore had reacted. No Rb phases were detected because the amount of Rb present in the sample was below the XRD detection level. It is likely, however, that Rb occurred as a solid-solution impurity in the $Cs_2Ca_2(SO_4)_3$ phase.

Duplicate leach tests were performed on the powdered reaction product. In each case, approximately 2.5 g of product (accurately weighed) was boiled with 100 mL pure water for 60 minutes, with continuous magnetic stirring, and then filtered while still hot. The filter residue was washed three times with 100-mL of boiling water. The filtrate plus washings were combined, cooled, and analyzed for Cs and Rb by atomic absorption (AA) spectrometry. The analyses were used to calculate the wt. % of Cs and Rb extracted by comparing the amount of each element in the leachate with the known amount of available Cs and Rb in each sample. The analysis results corresponded to 102.2±0.6% Cs extraction and 109.5±0.2% Rb extraction. The fact that these results were greater than 100% is attributed to compounding of analytical errors, particularly with the relatively low Rb concentrations involved. Nevertheless, these results indicate complete (i.e., 100%) extraction of Cs and Rb.

Further XRD analysis on the washed filter residues (i.e., after leaching and filtration) indicated that they were comprised of gehlenite, larnite and $CaSO_4$; the latter phase is formed by leaching of $Cs_2Ca_2(SO_4)_3$. Thus, the XRD results confirmed the AA-analysis conclusion of complete Cs extraction. The experiment also indicated that spray-drying is an effective method for drying the milled powders prior to heat-treatment.

Example 5

The same mixture of pollucite ore, calcium carbonate, and Plaster of Paris as in Example 4 was milled with 67 mL of water for 6 hours, and then allowed to settle. Surplus water was decanted, and the remaining solids were oven dried at 100° C. The dried solids were then re-mixed by hand and subjected to the same heat treatment, XRD analyses, boiling-water leach tests, and AA analyses as in Example 4.

The XRD trace for the reaction product after heat treatment was virtually identical to that of Example 4, indicating complete pollucite-ore reaction and formation of $Cs_2Ca_2(SO_4)_3$, gehlenite and larnite. The AA analyses corresponded to Cs and Rb extractions of 102.4±0.2 wt. % and 110.0±0.7 wt. %, respectively, i.e., to complete Cs and Rb extraction. The washed filter residues were shown by XRD analysis to contain gehlenite, larnite and $CaSO_4$, thus confirming the AA-analysis conclusion of complete Cs extraction. This experiment also indicated that simple oven-drying is an equally effective method for drying the milled powders prior to heat-treatment.

Example 6

The same mixture of pollucite ore, calcium carbonate, and Plaster of Paris as in Example 4 was milled with 67 mL of water for 6 hours, and then allowed to settle. Surplus water was decanted, and the remaining solids were oven dried at 100° C. The dried solids were then re-mixed by hand and then pressed into four, about 10-gram, 1-inch-diameter pellets, using a wax binder. The pellets were placed on platinum foil, loaded into the furnace and subjected to the same heat treatment, XRD analyses, boiling-water leach tests and AA analyses as in Examples 4 and 5.

The XRD trace for the reaction product after heat treatment was virtually identical to those of Examples 4 and 5, indicating complete pollucite-ore reaction and formation of $Cs_2Ca_2(SO_4)_3$, gehlenite and larnite. The AA analyses corresponded to Cs and Rb extractions of 101.3±0.2 wt. % and 108.1±0.2 wt. %, respectively, i.e., complete extraction of Cs and Rb. The washed filter residues contained gehlenite, larnite and $CaSO_4$ as the only phases, thus confirming that all the Cs and Rb had been extracted. The experiment also indicated that the milled powders, after drying, can be pelletized to facilitate handling during subsequent processing.

Example 7

A mixture of 40.0 g of pollucite ore plus 21.32 g of commercial Plaster of Paris plus 71.38 g of reagent grade calcium carbonate (Anachemia) was ball-milled with 200 mL of pure water for 6 hours to produce a slurry containing micron-sized particles. The slurry was then allowed to settle, surplus water was decanted, and the remaining solids were oven dried at 100° C. After addition of a wax binder to the powder, twelve about 10 g pellets were pressed, using a 1-inch diameter steel die. Two pellets, resting on a platinum sheet, were used for each of the following experiments.

The pellets were heated at 10° C./min to 1150° C. and were held at 1150±10° C. for 1, 5, 10, 15, 30 or 45 minutes. The pellets were then cooled at a rate of 10° C./min the heat-treated pellets were then crushed to pass through a 200-mesh sieve. Sample from each heating experiment were used for XRD phase analyses and boiling-water leach tests, as in Examples 4-6. The Cs extraction results from AA analysis are provided in the table below.

Cesium extraction results

| Time at 1150° C. (minutes) | wt. % Cs extracted (based on AA analyses) |
|---|---|
| 1 | 101.1 ± 1.1 |
| 5 | 104.9 ± 2.5 |
| 10 | 103.2 ± 2.1 |
| 15 | 98.4 ± 0.4 |
| 30 | 96.5 ± 0.3 |
| 45 | 96.7 ± 1.5 |

Taking analysis error into consideration, the above results indicated that the reaction was essentially complete after only 1-minute heating at 1150° C., and that longer hold times are unnecessary for 100% Cs extraction. The results were confirmed by XRD analyses, which produced virtually identical traces in each case. The reaction products were $Cs_2Ca_2(SO_4)_3$, and larnite, with no pollucite remaining in the phase assemblage.

Example 8 a dry-powder mixture of 40.0 g of pollucite ore plus 21.32 g of commercial Plater if Paris plus 71.38 g of reagent grade calcium carbonate (Anachemia) was ball-milled for 30 minutes to break down agglomerates. After addition of a wax binder to the powder, twelve about 10 g pellets were pressed, using a 1-inch diameter steel die. Two pellets, resting on a platinum sheet, were used for each of the following heating experiments:

Heating at 10° C./min to 1100° C., 30 minute hold at 1100±10° C., cooling at 10° C./min
Heating at 10° C./min to 1100° C., 45 minute hold at 1100±10° C., cooling at 10° C./min.
Heating at 10° C./min to 1100° C., 60 minute hold at 1100±10° C., cooling at 10° C./min.
Heating at 10° C./min to 1150° C., 30 minute hold at 1150±10° C., cooling at 10° C./min
Heating at 10° C./min to 1150° C., 45 minute hold at 1150±10° C., cooling at 10° C./min.
Heating at 10° C./min to 1150° C., 60 minute hold at 1150±10° C., cooling at 10° C./min.

Each pellet was weighed before and after heat-treatment. The weight-loss results confirmed that no sulfate breakdown or $SO_x$ evolution occurred during any of the heat-treatments.

The heat-treated pellets were then crushed to pass through a 200-mesh sieve. Samples from each heating experiment were used for XRD phase analyses and boiling-water leach tests, as in Examples 4-6. The Cs extraction results from AA analysis are provided in the table below.

Cesium extraction results

| Peak temperature (° C.) | Time at peak temperature (minutes) | wt. % Cs extracted (based on AA analyses) |
|---|---|---|
| 1100 | 30 | 82.5 ± 0.3 |
| | 45 | 94.1 ± 1.3 |
| | 60 | 93.8 ± 0.3 |
| 1150 | 30 | 85.0 ± 0.3 |
| | 45 | 94.0 ± 0.3 |
| | 60 | 99.1 ± 0.8 |

The XRD results for the reaction products and the filter residues after leaching confirmed that the pollucite in each experiment had undergone essentially complete reaction to form $Cs_2Ca_2(SO_4)_3$, gehlenite, larnite and other minor phases. It was evident from the AA results and XRD analyses that the reaction yield increased with longer holding time at the peak temperature, and that the reaction yield was higher at 1150° C. than at 1100° C. According to the experiment, significantly shorter times were required for complete pollucite reaction in cases where the starting materials were initially ball-milled under water to produce micron-sized particles of pollucite ore.

Example 9

A mixture of 40.0 g of pollucite ore plus 32.2 g of reagent grade barium sulfate plus 71.4 g of reagent grade calcium carbonate was ball-milled under pure water for 4 hours, using alumina grinding media. After drying, crushing, and addition of a wax binder, the mixture was pressed in a 1-inch diameter steel die into a series of about 15 g pellets. The pellets were placed on platinum foil, loaded into a programmable furnace and heat-treated. The furnace was heated from room temperature to 1150° C. at 10° C./min, and the temperature was held for 30 minutes at 1150±10° C., the furnace was then cooled at 10° C./min to room temperature.

The heat-treated pellets were then individually crushed to pass through a 200-mesh sieve. Samples of the crushed pellets were used for XRD phase analyses and boiling-water leach tests, as in Examples 4-8. The XRD analyses indicated a complex assemblage of reaction products, with the only cesium phase being cesium sulfate, $Cs_2SO_4$. The other phases present included barite ($BaSO_4$), larnite, gehlenite, and barium calcium silicate ($Ba_{1.3} Ca_{0.7} SiO_4$). Pollucite was noticeably absent in the phase assemblage, indicating that it had completely reacted. The leach-test results gave corresponding Cs extraction values of 97.0±1.4%, confirming that all pollucite had reacted to form the water-soluble $Cs_2SO_4$ phase.

Example 10

Eight intimate mixtures of pollucite ore with powdered lithium sulfate monohydrate ($Li_2SO_4.H_2O$) were prepared, using the ratios listed in the table below. Each mixture was heated in an electric furnace for 30 minutes at 1300° C., using ceramic crucibles, and then cooled rapidly in air. To ensure reproducibility of the results, some experiments were performed in duplicate, or were repeated using longer dwell times at 1300° C. (see table below).

In every case, the mixture melted to form two liquid phases, namely, a dense sulfate phase and a more fluid aluminosilicate phase. After cooling, the two phases were readily separated by hand. Samples of each phase were chemically analyzed for alkali ions (Cs, Rb, Li, Na and K) by atomic absorption spectroscopy, for silicon and aluminum by inductively coupled plasma emission spectroscopy, and for sulfate by ion chromatography. From each set of analyses, the percentage of total cesium or rubidium that had partitioned into the water-soluble sulfate phase during melting was calculated, as shown in the table below. In all cases, the results showed that Cs and Rb had equilibrated between the sulfate and aluminosilicate phases after 30 minutes at 1300° C., i.e., the relative Cs and Rb concentrations showed no significant changes with longer heating times.

Starting material ratios and mean Cs and Rb weight-percent extractions into the sulfate phase in 1300° C. fusion experiments

| Initial wt. % pollucite ore | Initial wt. % $Li_2SO_4.H_2O$ | Dwell times at 1300° C. (min.) | Mean wt. % Cs in final sulfate phase after melting | Mean wt. % Rb in final sulfate phase after melting |
|---|---|---|---|---|
| 24.0 | 76.0 | 30, 30 | 97.5 | *107.7 |
| 32.0 | 68.0 | 30, 30 | 91.7 | *102.1 |
| 38.0 | 62.0 | 30, 30 | 87.8 | 96.8 |
| 44.85 | 55.15 | 30, 60, 90 | 81.1 | 86.0 |
| 49.40 | 50.60 | 30, 60, 90 | 76.8 | 77.9 |
| 54.95 | 45.05 | 30, 60, 90 | 72.9 | 75.6 |
| 61.92 | 38.08 | 30, 60, 90 | 58.6 | 64.1 |
| 70.92 | 29.08 | 30, 60, 90 | 46.7 | 53.8 |

*Results exceeding 100% are attributed to analysis errors.

Figure 9:
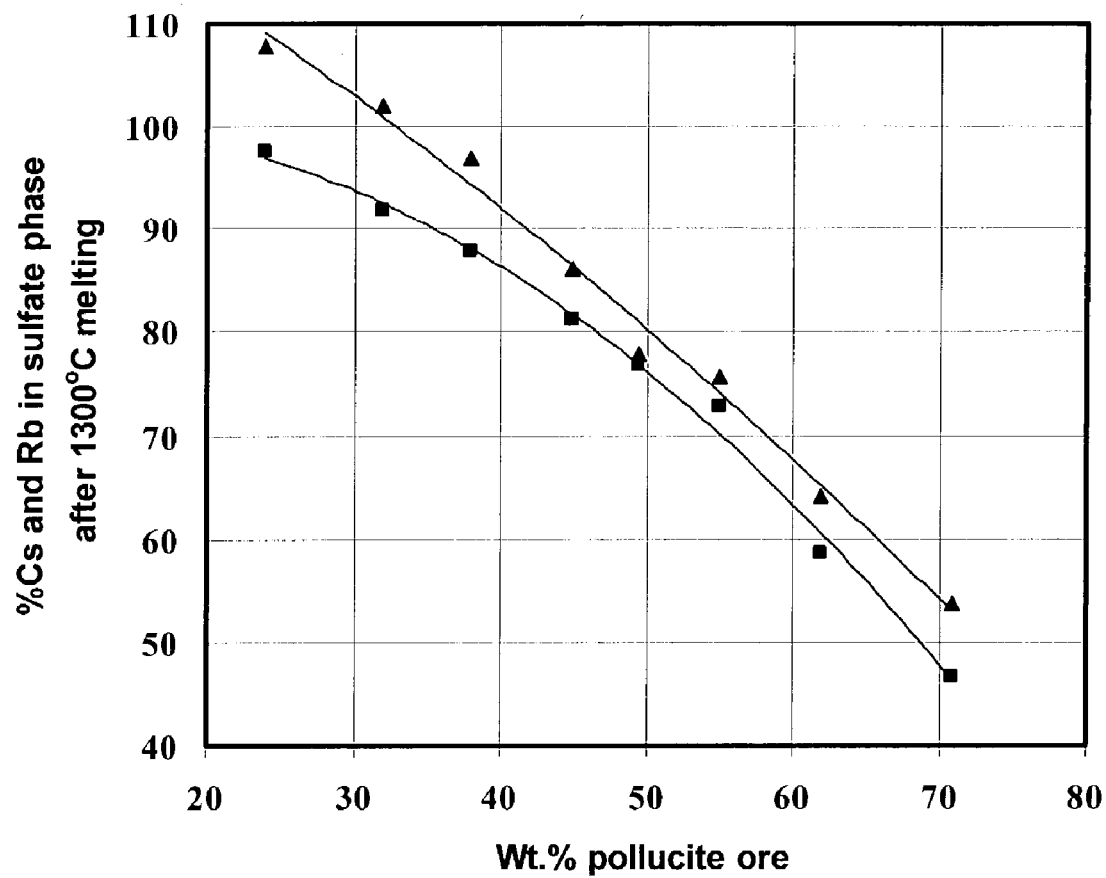
FIG. 9 is a graph of the Cs and Rb concentrations in the sulfate phase vs. starting-material composition, after 30 minute heat-treatment at 1300° C.

The mean Cs and Rb concentrations in the sulfate phase after 1300° C. fusion are shown plotted against the starting material compositions in FIG. 9. The results confirm that the weight percent of Cs and Rb partitioned into the sulfate phase is approximately inversely proportional to the weight percent of pollucite ore in the starting mixture. Thus, for example, using a starting mixture containing 40 wt. % of pollucite ore, >85 wt. % of the Cs and >90 wt. % of the Rb migrate into the molten sulfate phase.

Example 11

Nine intimate mixtures of pollucite ore with powdered lithium sulfate monohydrate ($Li_2SO_4.H_2O$) were prepared, using the ratios listed in the table below. Each mixture was tamped into a ceramic crucible, heated in an electric furnace for 30 minutes at 1100° C., and then cooled rapidly in air. The heating experiments were either performed in duplicate, or were repeated using longer dwell times at 1100° C. (see the table below).

The heat-treated mixtures were sintered masses containing separate grains of the aluminosilicate and sulfate phases. The reaction products were crushed to pass through a 200-mesh sieve, and then leached in pure water at 90° C. with stirring to dissolve the sulfate phase. The leached product was filtered and the filter residue repeatedly washed to recover all the dissolved sulfates. Chemical analyses were then performed on the sulfate solutions, and also on the insoluble aluminosilicate residues, using the same methods as in Example 10. The analyses were used to calculate the percentage of total cesium or rubidium that had partitioned into the water-soluble sulfate phase during 1100° C. heat-treatment (see the table below). The analysis results also showed that 30 minutes was sufficient time to allow the Cs and Rb concentrations in the sulfate and aluminosilicate phases to reach equilibrium, and there were no significant concentration changes using longer heating times.

Starting material ratios and mean Cs and Rb weight-percent extractions into the sulfate phase in 1100° C. fusion experiments

| Initial wt. % pollucite ore | Initial wt. % $Li_2SO_4.H_2O$ | Dwell times at 1100° C. (min.) | Mean % Cs in final sulfate phase after sintering | Mean % Rb in final sulfate phase after sintering |
|---|---|---|---|---|
| 24.0 | 76.0 | 30, 30 | 89.3 | *101.6 |
| 32.0 | 68.0 | 30, 30 | 89.6 | 96.3 |
| 38.0 | 62.0 | 30, 30 | 85.7 | 96.8 |
| 44.85 | 55.15 | 30, 60, 90 | 75.1 | 87.4 |
| 49.40 | 50.60 | 30, 60, 90 | 63.2 | 74.9 |
| 54.95 | 45.05 | 30, 60, 90 | 62.2 | 81.7 |
| 61.92 | 38.08 | 30, 60, 90 | 42.7 | 66.4 |
| 70.92 | 29.08 | 30, 60, 90 | 25.2 | 46.8 |
| 82.99 | 17.01 | 30, 60, 90 | 7.9 | 20.2 |

*Results exceeding 100% are attributed to analysis errors.

Figure 10:
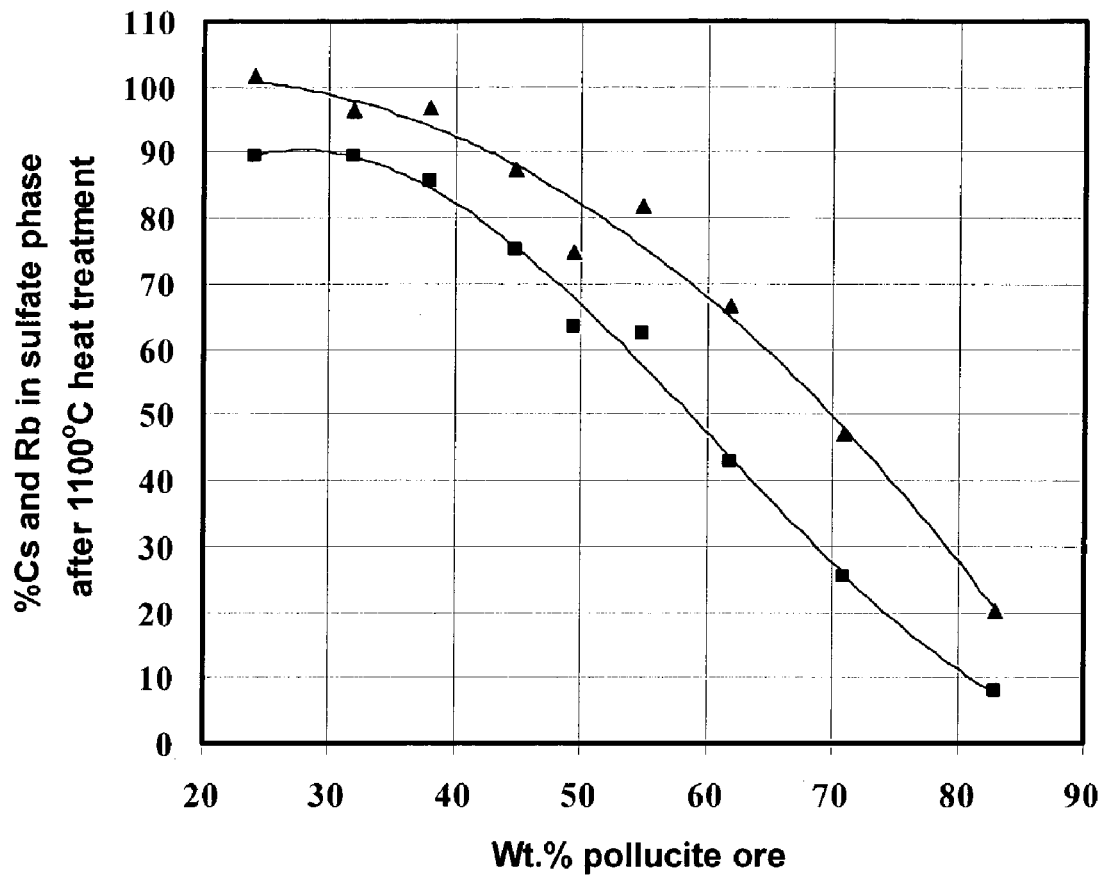
FIG. 10 is a graph of the Cs and Rb concentrations in the sulfate phase vs. starting-material composition, after 30 minute heat-treatment at 1100° C.

The mean Cs and Rb concentrations in the sulfate phase are shown plotted against the starting material compositions in FIG. 10. As in Example 10, the results confirmed that the weight percent of Cs and Rb partitioned into the sulfate phase was approximately inversely proportional to the weight percent of pollucite ore in the starting mixture. Thus, for example, using a starting mixture containing 40 wt. % of pollucite ore, >80 wt. % of the total Cs and >90 wt. % of the total Rb migrate into the sulfate phase during heat-treatment.

Example 12

A mixture of 40 g of pollucite ore having been previously milled to about 80% −200 mesh powder, with analyzed Cs and Rb contents of 15.25±0.5% and 0.60±0.03 weight % respectively, plus 21.32 g of commercial Plaster of Paris plus 71.38 g of laboratory grade calcium carbonate (Anachemia) was prepared, which is equivalent to 40 wt. % pollucite ore, 40 wt. % CaO, 20 wt. % $CaSO_4$. The batched material was wet-milled for 6 hours in 200 mL of distilled water, using half-diameter alumina grinding media. During this time, the Plaster of Paris would have re-hydrated to form gypsum, $CaSO_4.2H_2O$, which would then be ground along with the other starting materials. The resulting slip was then either spray-dried or oven-dried. Samples (about 40-g) of spray-dried or oven-dried material were loosely tamped into platinum crucibles and heated at 10° C./min to 1100° C., and were then held for 5 minutes at 1150±5° C. The product was then cooled at 10° C./min. Additional oven-dried material (about 40-g) was also pelletized without any binder addition, and then fired using the same temperature profile.

All three materials were ground to −200 mesh powder in a tungsten carbide disk mill. Samples of the crushed materials were then used for duplicate boiling water leach tests. In each test, about 2.5 g samples were boiling in 100 mL water for 30 minutes with continuous stirring, followed by filtration, washing of the filter residue with further boiling water, and making up to 500 mL volume. The leachates were then analyzed for Cs and Rb using AA spectroscopy.

The original ore composition included 15.25±0.5 Cs; 0.45±10.1 Li; 0.60±0.03 Rb; 1.12±0.09 Na; 0.85±0.02 K; 26.83±1.43 Si; and 7.97±0.19 Al in wt %. The results of analysis and duplicate leach-test samples were as follows:

| Sample No. | Sample wt. (g) | Max Cs conc. (μg/ml) | Measured Cs conc. (μg/ml) | % Cs Extracted | Max Rb conc. (μg/ml) | Measured Rb conc. (μg/ml) | % Rb Extracted |
|---|---|---|---|---|---|---|---|
| Pelletized A | 2.5589 | 312 | 332 | 106.3 | 12.3 | 13.3 | 108.3 |
| Pelletized B | 2.5103 | 306 | 327 | 106.8 | 12.0 | 13.0 | 107.9 |
| Non-Pelletized A | 2.5538 | 312 | 329 | 105.6 | 12.3 | 13.4 | 109.3 |
| Non-Pelletized B | 2.5564 | 312 | 327 | 104.8 | 12.3 | 13.6 | 110.8 |
| Spray dried A | 2.5456 | 311 | 325 | 104.6 | 12.2 | 13.4 | 109.7 |
| Spray dried B | 2.5548 | 312 | 327 | 104.9 | 12.3 | 13.4 | 109.3 |

The calculated recoveries for Cs and Rb in all cases exceed 100%. The relatively high results are attributed to compounding of analytical errors in the leachate determinations and the Cs/Rb ore assays. Nevertheless, the analyses confirm that complete Cs and Rb extraction was obtained in all cases.

In conclusion, firing of wet-milled Ca25 batch materials at 1150° C. for 5 minutes provided completed pollucite reaction to form water-soluble sulfate compounds of Cs and Rb. Boiling water leach tests allowed 100% of the Cs and Rb to be recovered in the leachate. The key to successful rapid reaction was the initial wet-milling state. Thus, the results were virtually identical for spray-dried, loosely consolidated, or pelletized material after initial wet milling.

Example 13

Samples using different composition weight ratios were prepared using finely ground $CaSO_4.2H_2O$ and −200 mesh pollucite. The respective mixes were then fired for 30 minutes at 1500° C. in a platinum crucible. The fused products were cracked out of the crucible and ground to about 300 mesh using a SPEX mill.

Water leach tests were then performed on the powdered reaction products. In each case, the powder was added to pure water, heated to 80° C. and vigorously agitated for 1.5 hours. The resulting suspensions were then filtered with the filter residue repeatedly washed with pure water at room temperature. The respective filtrates and wash waters were then combined and analyzed for Cs content by atomic absorption spectrometry. The compositions and results are presented below in Table 1. Taking analysis errors into consideration, the results of the 75 wt. % CaSO4.2H2O: 25 wt % pollucite mix indicate an essentially complete (i.e. 100%) Cs extraction.

The high extraction values for the Ca5/30/1500 composition series were also independently confirmed by the XRD analysis of both the fused products and washed filter residues and also by the very low Cs content of the washed residues.

The compositions and sample codes used are shown in the table below: Three batches of each sample composition are indicated in the table. This was done in order to verify reproducibility.

| Compositions and Sample Codes | | | | |
|---|---|---|---|---|
| Sample Code | Wt. % pollucite | Wt. % $CaSO_4.2H_2O$ | Description of fusion test | Weight % Extraction |
| Ca3/30/1500 | 50.0 | 50.0 | Initial fusion experiment using 100 g batch in a Pt crucible, held at 1500° C. for 30 min | 1.7 |
| Ca4/30/1500 | 37.5 | 62.5 | Initial fusion experiment using 100 g batch in a Pt crucible, held at 1500° C. for 30 min. | 72.0 |
| Ca5/30/1500 | 25.0 | 75.0 | Initial fusion experiment using 100 g batch in a Pt crucible, held at 1500° C. for 30 min. | 119.0 |
| 1Ca3/30/1500 | 50.0 | 50.0 | Repeated leaching trial on SPEX-milled powder from initial Ca3/30/1500 fusion. | 1.6 |
| 1Ca4/30/1500 | 37.5 | 62.5 | Repeated leaching trial on SPEX-milled powder from initial Ca4/30/1500 fusion. | 67.8 |
| 1Ca5/30/1500 | 25.0 | 75.0 | Repeated leaching trial on SPEX-milled powder from initial Ca5/30/1500 fusion. | 114.6 |
| 2Ca3/30/1500 | 50.0 | 50.0 | Repeated fusion and leaching trial, 100 g batch in a Pt crucible, held at 1500° C. for 30 min. | 2.2 |
| 2Ca4/30/1500 | 37.5 | 62.5 | Repeated fusion and leaching trial, 100 g batch in a Pt crucible, held at 1500° C. for 30 min. | 63.0 |

-continued

Compositions and Sample Codes

| Sample Code | Wt. % pollucite | Wt. % $CaSO_4.2H_2O$ | Description of fusion test | Weight % Extraction |
|---|---|---|---|---|
| 2Ca5/30/1500 | 25.0 | 75.0 | Repeated fusion and leaching trial, 100 g batch in a Pt crucible, held at 1500° C. for 30 min. | 109.7 |

Example 14

The purpose of this trial was to demonstrate the applicability of the fusion technique for the extraction of cesium from low cesium assay bearing ore. The trial was executed to confirm that the fusion technique does provide an excellent method for yielding good cesium extraction from low assay ores.

The starting materials were as-received low-assay pollucite (LAP) analyzed at 5.82 wt % $Cs_2O$, commercial "Plaster of Paris", nominally $CaSO_4.\frac{1}{2}H_2O$, and Anachemia laboratory grade $CaCO_3$. The 100 g Ca-25 batch was formulated as follows:

| Initial Mix | 40.00 g | 21.32 g | 71.39 g |
|---|---|---|---|
|  | −200 mesh pollucite | $CaSO_4.\frac{1}{2}H_2O$, | $CaCO_3$ |
| Clinker Composition (Calculated) | 40.00% pollucite | 20.00% $CaSO_4$ | 40.00% CaO |

The mixed powders were wet ball-milled, dried and granulated by brushing through a 50-mesh (300-μm) sieve. The granulated powder was mixed with 60 ml of 5% paraffin wax solution in $CHCl_3$, and further $CHCl_3$ was added to form a slurry. After drying overnight at 35° C. in an air convection oven to remove all traces of $CHCl_3$, the waxed powder was re-granulated through a 30-mesh (600-μm) sieve.

Four 1-inch diameter pellets were pressed in a hardened steel die set, using about 15 g powder for each pellet and a load of 5000 lbs. Two pellets, resting on platinum sheet, were used for each of the following firing trials:

Heating at 10° C./min to 1150° C., 45 minute hold at 1150±10° C., cooling at 10° C./min. Code Ca25SM-LAP/45/1150.

Heating at 10° C./min to 1150° C., 60 minute hold at 1150±10° C., cooling at 10° C./min. Code Ca25SM-LAP/60/1150.

All fusion products were ground to −200 mesh powder and used for XRD phase analyses, and for boiling water leach tests. The leach test residues were also analyzed by XRD, and were chemically analyzed for residual Cs to enable mass balance calculations to be made.

Duplicate leach tests in boiling water were performed on crushed (−200 mesh) samples of fused Ca25SM-LAP/45/1150 and Ca25SM-LAP/60/1150, using the same method as before. The results are summarized in the Table below.

Results of Ca25SM-LAP leachate analyses(AA)

| Sample No. | Temp, ° C. | Time, Minutes | Leach Sample | % Cs Extracted |
|---|---|---|---|---|
| Ca25SM-LAP/45/1150A | 1150 | 45 | A | 88.5 |
| Ca25 SM-LAP/45/1150B | 1150 | 45 | B | 87.7 |
| Ca25 SM-LAP/60/1150A | 1150 | 60 | A | 87.2 |
| Ca25 SM-LAP/60/1150B | 1150 | 60 | B | 88.2 |

Recoveries by leachate analysis ranged from 87-89%. XRD analyses of both the reaction product and leached residue confirmed this result. XRD of the reaction products indicated that $Cs_2Ca_2(SO_4)_3$ was the only cesium phase. XRD of the leached residues depicted no cesium present, including no residual pollucite. Finally, the cesium content remaining in the leached residue was extremely low analyzing from 0.05% to 0.07%. This also suggested near complete extraction of cesium.

Thus, it is evident that the reaction is favored thermodynamically, and is generally insensitive to the ore cesium content. In theory, therefore, the reaction can be driven to completion by attention to kinetic factors, such as particle size of the reactants and reaction time at temperature.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims and equivalents thereof.

What is claimed is:

1. A method for recovering at least cesium, rubidium, or both from an ore or other material comprising:
    reacting said ore or other material with at least one sulfate salt capable of recovering at least one portion of said cesium, rubidium, or both from said ore or other material to form a reaction product that includes said cesium, rubidium, or both; and
    recovering said cesium, rubidium, or both from said reaction product, and
    wherein said cesium, rubidium, or both is in the form of a cation, a salt, a metal-containing compound, or a metal, or combinations thereof.

2. The method of claim 1, wherein cesium is recovered.

3. The method of claim 1, wherein said ore comprises a silicate-based ore.

4. The method of claim 1, wherein said ore comprises an aluminosilicate-based ore.

5. The method of claim 1, wherein said ore is present in a size of about −200 mesh or smaller.

6. The method of claim 1, wherein said at least one salt is present as a powder.

7. The method of claim 1, wherein said at least one salt is present in a size of about −200 mesh or smaller.

8. The method of claim 1, wherein said salt is in intimate contact with said ore.

9. The method of claim 1, wherein said ore and said at least one salt have a weight ratio of said ore to said salt of from about 15:85 to about 85:15.

10. The method of claim 1, wherein said reaction product is formed by at least one heat-induced reaction.

11. The method of claim 10, wherein said at least one heat-induced reaction occurs at a temperature sufficient so that at least a partial metal ion exchange occurs between said ore and said at least one salt.

12. The method of claim 11, wherein said at least one heat-induced reaction occurs at a temperature of at least about 500° C.

13. The method of claim 1, wherein said reaction product is formed by a pressure-induced reaction, a heat-induced reaction, or combinations thereof.

14. The method of claim 1, wherein said ore and said at least one salt are mixed together and are heated to a temperature of from about 500° C. to about 1650° C.

15. The method of claim 1, further comprising crushing at least a portion of said reaction product to form a crushed material prior to recovering said at least one cesium, rubidium, or both.

16. The method of claim 15, further comprising dissolving at least a portion of said crushed material in a solvent to form a solution, and optionally concentrating said solution.

17. The method of claim 16, wherein said solution comprises said at least one cesium, rubidium, or both.

18. The method of claim 17, wherein said solution comprises $(Li, Cs)_2SO_4$, $Cs_2Ca_2(SO_4)_3$, $(Li, Cs, Rb)_2SO_4$, $(Cs, Rb)_2Ca_2(SO_4)_3$, $Rb_2Ca_2(SO_4)_3$, $Cs_2SO_4$, or $Rb_2SO_4$.

19. The method of claim 16, wherein said crushed material is leached in an aqueous solution to form a sulfate solution.

20. The method of claim 1, further comprising recovering said at least one cesium, rubidium, or both as a soluble sulfate compound.

21. The method of claim 16, further comprising boiling said solution to concentrate said solution.

22. The method of claim 16, further comprising contacting at least one soluble carbonate source to said solution and optionally contacting at least one base to said solution.

23. The method of claim 22, wherein said at least one carbonate source is a gas.

24. The method of claim 1, further comprising adding at least one base to said ore and said at least one salt.

25. The method of claim 24, wherein said base is $Ca(OH)_2$, CaO, calcium carbonate, or combinations thereof.

26. The method of claim 16, further comprising performing a solid/liquid separation process on said solution to remove gangue material.

27. The method of claim 1, wherein said ore is low-assay ore.

28. The method of claim 1, wherein said ore and said at least one salt are wet milled.

29. The method of claim 1, wherein said at least one salt is a Group II sutfate.

30. The method of claim 29, wherein said Group II sulfate is a Mg, Ca, Sr, Ba sulfate, or any combination thereof.

31. The method of claim 24, wherein said base comprises Mg, Ca, Sr, Ba carbonates, hydroxides, oxides, or any combination thereof.

32. The method of claim 18, further comprising adding water to said $Cs_2Ca_2(SO_4)_3$ to form $Cs_2SO_4$ solution, $CaSO_4$, and a byproduct.

33. The method of claim 32, wherein said byproduct comprises a cement meal or an aggregate material.

34. The method of claim 32, wherein said byproduct comprises Ca alunilnosiicate.

35. The method of claim 18, further comprising adding water to said $(Cs, Rb)_2Ca_2(SO_4)_3$ to form $(Cs, Rb)_2SO_4$ solution, $CaSO_4$, and a byproduct.

36. The method of claim 35, wherein said byproduct comprises a cement meal or an aggregate material.

37. The method of claim 35, wherein said byproduct comprises Ca aluminosilicate.

38. The method of claim 24, wherein said base comprises at least Group II carbonate, hydroxide, oxide or combinations thereof.

39. The method of claim 18, further comprising adding water to said $(Cs, Li)_2SO_4$ to form $Cs_2SO_4$ solution, $LiSO_4$, and a byproduct.

40. The method of claim 39, wherein said byproduct comprises a Spodumene or Petalite.

41. The method of claim 39, wherein said byproduct comprises Li enriched aluminosilicate.

42. The method of claim 18, further comprising adding water to said $(Cs, Rb, Li)_2 SO_4$ to form $(Cs, Rb)_2 SO_4$ solution, $LiSO_4$, and a byproduct.

43. The method of claim 42, wherein said byproduct comprises a cement meal or an aggregate material.

44. The method of claim 42, wherein said byproduct comprises Li enriched aluminosilicate.

45. A method for recovering at least one metallic element from an ore or other material comprising:
    reacting said ore or other material with at least one sulfate salt capable of recovering at least a portion of said metallic element from said ore or other material to form a reaction product that includes said metallic element;
    crushing said reaction product to form a crushed material, wherein said crushed material comprises said metallic element;
    dissolving at least a portion of said crushed material in a solvent to form a solution and optionaily concentrating said solution; and
    recovering said at least one metallic element from said solution, wherein said metallic element comprises cesium, rubidium, or both.

46. The method of claim 45, wherein said at least one metallic element is cesium, wherein said ore is cesium bearing, wherein said at least one salt is $Li_2SO_4$, wherein said reaction product is formed by at least one heat-induced reaction, and wherein said solvent is water.

47. The method of claim 46, wherein said at least one heat-induced reaction occurs at a temperature of from about 1100° C. to about 1300° C.

48. The method of claim 45, further comprising adding $Ca(OH)_2$, CaO, calcium carbonate, or combinations thereof to said solution or mixture of said ore and said at least one salt.

49. The method of claim 45, further comprising contacting at least one soluble carbonate source to said solution, and optionally contacting at least one base to said solution.

50. The method of claim 45, wherein said at least one metallic element is cesium, wherein said ore is cesium bearing, wherein said at least one salt is $CaSO_4$, wherein said reaction product is formed by at least one heat-induced reaction, and wherein said solvent is water.

51. The method of claim 50, wherein said at least one heat-induced reaction occurs at a temperature of from about 1200° C. to about 1650° C.

52. The method of claim 45, further comprising adding CaO to said solution of said ore or other material and said at least one salt, wherein said at least one metallic element is cesium, wherein said ore is cesium bearing, wherein said at least one salt is $CaSO_4$, wherein said reaction product is formed by at least one heat-induced reaction, and wherein said solvent is water.

53. The method of claim 52, wherein said heat-induced reaction occurs at a temperature of from about 1000° C. to about 1300° C.

54. The method of claim 45, wherein said ore is low-assay ore.

55. The method of claim 45, wherein said ore and said at least one salt are wet milled.

56. The method of claim 45, wherein said at least one metallic element is rubidium or cesium and rubidium, wherein said ore is cesium bearing, wherein said at least one salt is $Li_2SO_4$, wherein said reaction product is formed by at least one heat-induced reaction, and wherein said solvent is water.

57. The method of claim 45, wherein said at least one metallic element is rubidium or cesium and rubidium, wherein said ore is cesium bearing, wherein said at least one salt is $CaSO_4$, wherein said reaction product is formed by at least one heat-induced reaction, and wherein said solvent is water.

58. The method of claim 45, further comprising adding CaO to said solution of said ore and said at least one salt, wherein said at least one metallic element is rubidium or cesium and rubidium, wherein said ore is cesium bearing, wherein said at least one salt is $CaSO_4$, wherein said reaction product is formed by at least one heat-induced reaction, and wherein said solvent is water.

59. The method of claim 45, wherein said metallic element is cesium.

60. The method of claim 45, wherein said reaction product is formed by a pressure-induced reaction, a heat-induced reaction, or combinations thereof.

61. The method of claim 45, wherein said at least one metallic element is from ore.

62. The method of claim 61, wherein said ore comprises $CsAlSi_2O_6$.

63. The method of claim 45, wherein said at least one salt is a Group II sulfate.

64. The method of claim 63, wherein said Group II sulfate is a Mg, Ca, Sr, Ba sulfate, or any combination thereof.

65. The method of claim 45, further comprising adding Mg, Ca, Sr, Ba carbonates, hydroxides, oxides, or any combination thereof to said solution or mixture of said ore and said at least one salt.

66. The method of claim 45, further comprising adding Li, Na, K, Rb, Cs carbonates, hydroxides, oxides, or any combination thereof to said solution of said ore and said at least one salt.

* * * * *